United States Patent [19]
Clark et al.

[11] Patent Number: 5,354,428
[45] Date of Patent: Oct. 11, 1994

[54] APPARATUS FOR THE CONTINUOUS ON-SITE CHEMICAL REPROCESSING OF ULTRAPURE LIQUIDS

[75] Inventors: R. Scot Clark, Fallbrook; Joe G. Hoffman, Carlsbad; John B. Davison, Mission Viejo; David W. Persichini, Oceanside; Wallace I. Yuan, Irvine; Bruce A. Lipisko, Encinitas, all of Calif.; Alan H. Jones, Scotsdale, Ariz.; Alan W. Jones, Mountain View, Calif.

[73] Assignee: Athens Corp., Oceanside, Calif.

[21] Appl. No.: 385,302

[22] Filed: Jul. 25, 1989

Related U.S. Application Data

[60] Continuation-in-part of Ser. No. 183,089, Apr. 19, 1988, Pat. No. 4,855,023, which is a division of Ser. No. 915,776, Oct. 6, 1986, Pat. No. 4,828,660.

[51] Int. Cl.$^5$ .............................................. B01D 3/28
[52] U.S. Cl. .................................... 202/154; 202/158; 202/161; 202/163; 202/175; 202/185.6; 202/186; 202/197; 202/267.1; 202/40; 202/49; 202/86; 202/87; 203/DIG. 2; 203/DIG. 22; 159/DIG. 19
[58] Field of Search ............... 202/175, 158, 153, 163, 202/197, 198, 235, 186, 185.6, 161, 267.1, 154; 203/DIG. 2, 99, 98, 86, 87, DIG. 22, 71, 73; 261/94, 97, 144; 159/901, DIG. 15, DIG. 19; 196/123-125, 100, 139

[56] References Cited

U.S. PATENT DOCUMENTS

| | | | |
|---|---|---|---|
| 1,513,354 | 10/1924 | Wadsworth | 202/158 |
| 2,006,491 | 7/1935 | Tolman | 159/DIG. 15 |
| 2,253,261 | 8/1941 | Bacon | 261/94 |
| 2,479,267 | 8/1949 | Sandford | 159/901 |
| 2,518,758 | 8/1950 | Cook | 203/DIG. 2 |
| 2,701,789 | 2/1955 | White | 203/DIG. 2 |
| 2,784,150 | 3/1957 | Rose et al. | 202/175 |
| 2,810,562 | 10/1957 | Eld et al. | 202/158 |
| 2,816,064 | 12/1957 | Smith | 202/158 |
| 3,192,130 | 6/1965 | Pottharst | 159/901 |
| 3,219,551 | 11/1965 | Carel et al. | 203/DIG. 2 |
| 3,230,156 | 1/1966 | Katzen | 202/154 |
| 3,240,682 | 3/1966 | Gordon | 203/DIG. 2 |
| 3,294,650 | 12/1966 | Manteufel | 159/DIG. 15 |
| 3,607,662 | 9/1971 | Glover | 203/DIG. 2 |
| 4,089,749 | 5/1978 | Karamian | 203/DIG. 2 |
| 4,257,852 | 5/1981 | Worrell | 202/154 |
| 4,267,150 | 5/1981 | Firestone | 203/DIG. 2 |
| 4,288,285 | 9/1981 | Houston | 159/901 |
| 4,331,513 | 5/1982 | Spevack | 202/158 |
| 4,465,559 | 8/1984 | Won | 202/175 |
| 4,778,535 | 10/1988 | McCord | 159/901 |
| 4,980,032 | 12/1990 | Dobson et al. | 203/40 |

FOREIGN PATENT DOCUMENTS

| | | | |
|---|---|---|---|
| 1086215 | 8/1960 | Fed. Rep. of Germany | 261/97 |
| 993969 | 2/1983 | U.S.S.R. | 202/175 |

OTHER PUBLICATIONS

Production and Analysis of Special High–Purity Acids Purified by Sub–Boiling Distillation, Kuehner et al., *Analytical Chemistry*, vol. 44, No. 12, Oct. 1972, pp. 2050–2056.

Purified Reagents for Trace Metal Analysis, Moody and Beary, *Talanta*, vol. 29, Jun. 1982, pp. 1003–1010.

*Primary Examiner*—Wilbur Bascomb, Jr.
*Attorney, Agent, or Firm*—Beehler & Pavitt

[57] ABSTRACT

Method and apparatus for the distillation of liquids which is particularly suited for the removal of soluble impurities and insoluble and non-volatile particles of 10 microns to 0.2 micron or less in size. A substantially elongated distillation chamber having walls equipped with axially disposed concentric boiling rings spaced from the walls near the bottom, and a packing stop, packing redirector rings for condensed vapor, and a reflux condenser in the upper part of the distillation chamber provide, during distillation, a smooth convective upward flow of distilling liquid and vapor proximate the walls and boiling rings and a smooth convective downward flow of distilling liquid and vapor substantially centrally of the distillation chamber.

18 Claims, 9 Drawing Sheets

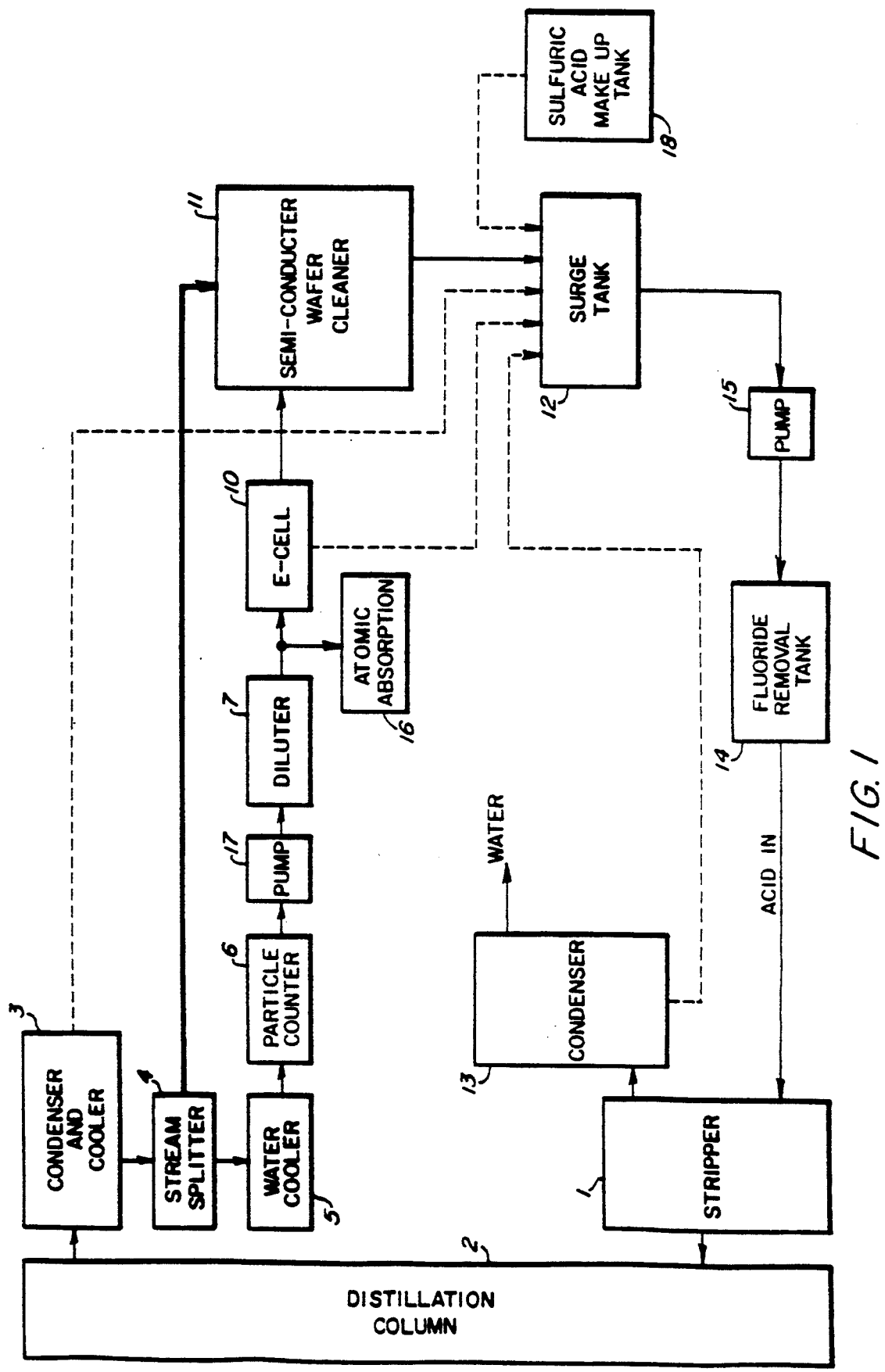
FIG. I

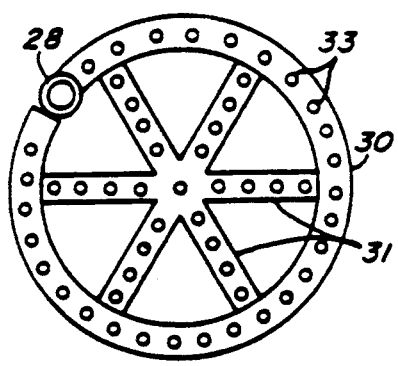
FIG. 3
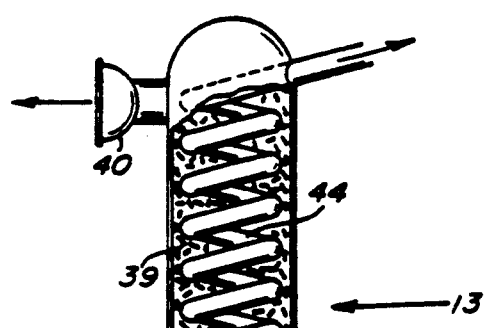
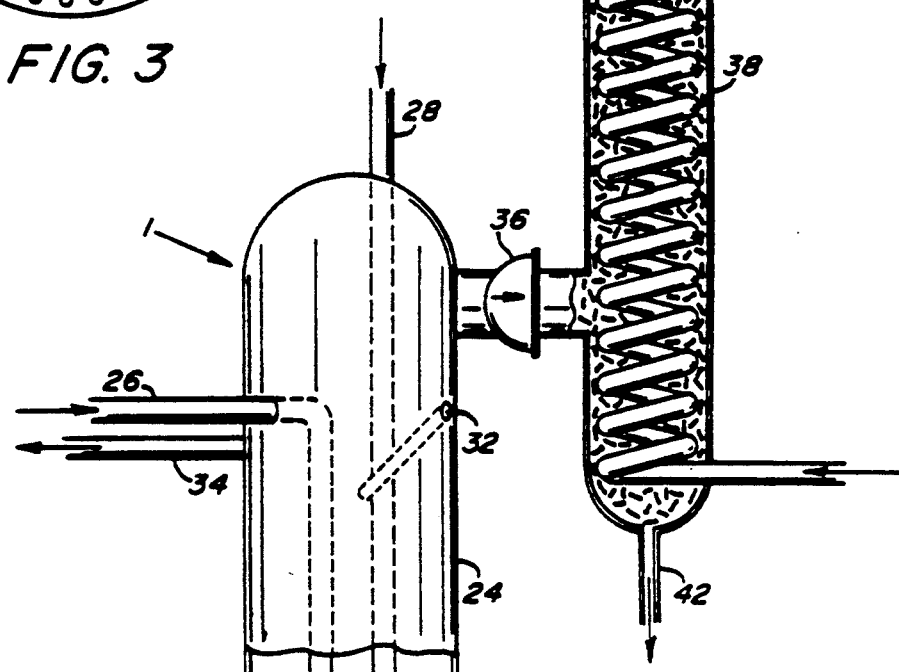
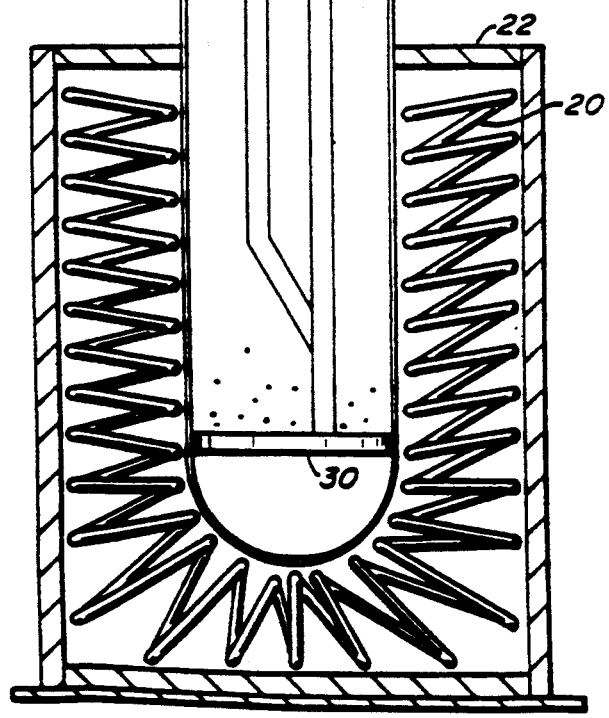
FIG. 2

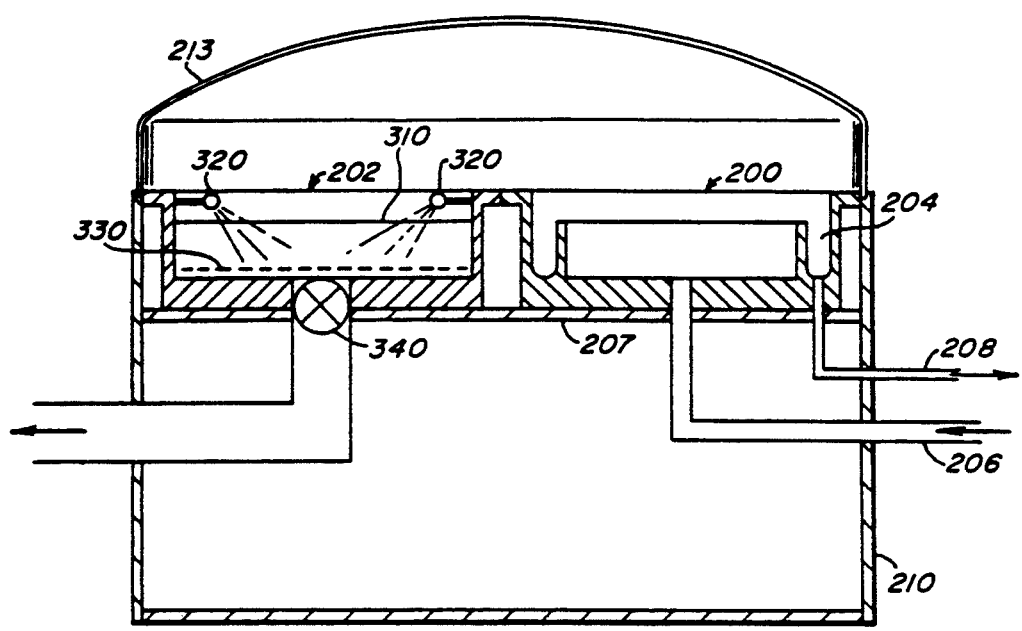
FIG. 8
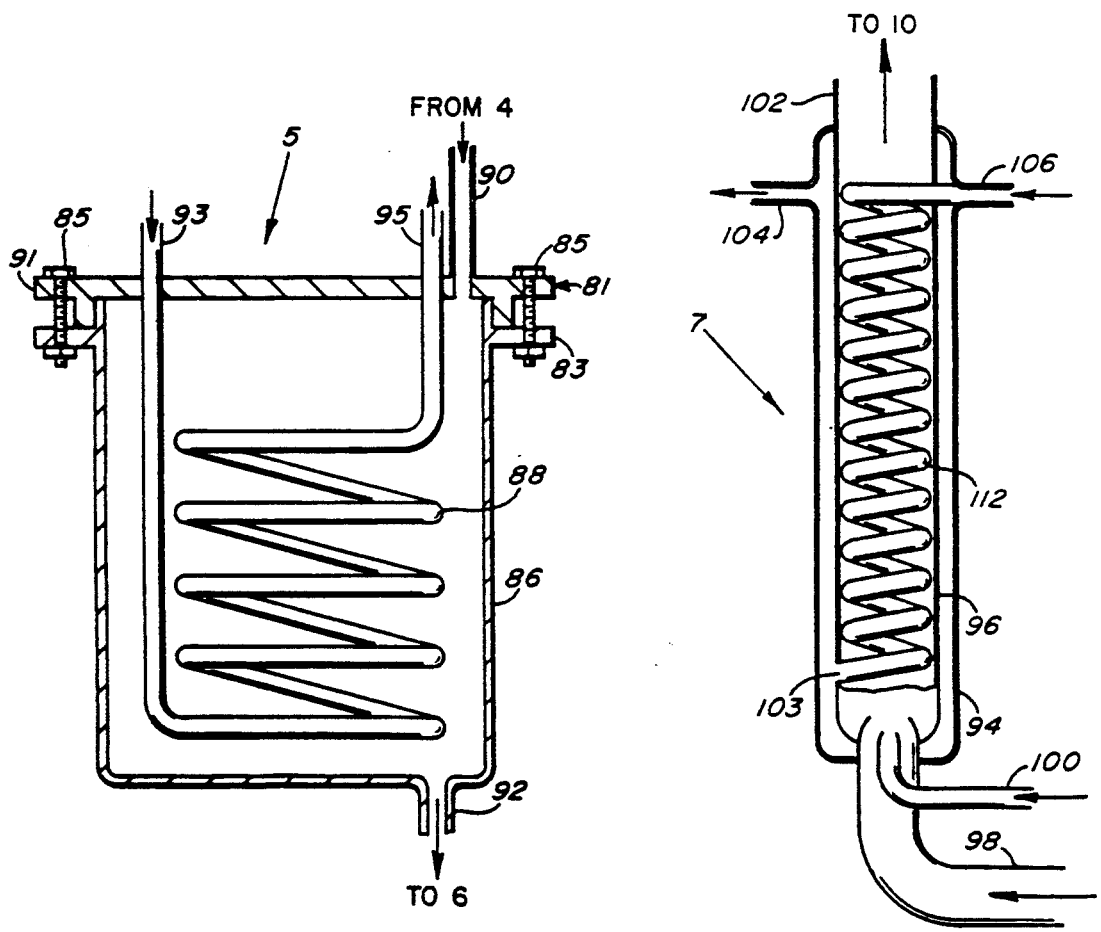
FIG. 6
FIG. 7

APPARATUS FOR THE CONTINUOUS ON-SITE CHEMICAL REPROCESSING OF ULTRAPURE LIQUIDS

This application is a continuation-in-part of application Ser. No. 07/183,089; filed Apr. 19, 1988 now U.S. Pat. No. 4,855,023, which is a division of Ser. No. 06/915,776, Filed: Oct. 6, 1986, now U.S. Pat. No. 4,828,660.

BACKGROUND OF THE INVENTION

1. Field of the Invention

This invention relates to a method and apparatus for the continuous on-site purification of ultrapure liquids, especially liquids used in a semiconductor wafer cleaning process, such as ultrapure peroxydisulfuric acid and sulfuric acid solutions.

2. Description of the Prior Art

In the past, it has been common practice in industries requiring chemicals, especially ultrapure chemicals, to utilize such chemicals until a certain degree of contamination was reached. At that point, it was necessary to remove the contaminated chemicals from the process apparatus, clean the apparatus, and add new chemicals as needed. Contaminated chemicals were commonly disposed of by any convenient means. This has included legal and illegal dumping in land areas and occasionally in waterways.

In the semiconductor industry it is important to remove all organic and inorganic particles from the surface of semiconductor wafers. This is commonly done by immersion in an acid bath. A preferred acid bath consists of an oxidant solution of sulfuric acid and either peroxydisulfate ion, which has the formula $S_2O_8^{-2}$, or hydrogen peroxide and ultrapure water. The oxidant solution is commonly made by mixing together the oxidant and sulfuric acid. This combination produces a highly oxidizing compound which attacks carbon or other organic particles on the surface of the wafers.

The wafers are commonly held in a cassette boat whereby they can be cleaned by immersion into a tank containing the oxidant solution. The time for immersion is usually about ten to twenty minutes. After immersion, the cassette boat containing the wafers is then washed in ultrapure water. The purity of the water is determined by measuring the resistivity of the water.

In prior art processes very high purity sulfuric acid and $H_2O_2$ or a source of peroxydisulfate are required. The bath temperature is maintained at about 80° C.-150° C. In about one half hour, contamination of the acid takes place with an increased concentration of particles. At this time, the acid is normally dumped and a new bath of high purity acid is added.

In recent years two developments have made this approach undesirable. The first of these has been the requirement of increasingly greater purity of chemicals, especially in industries such as the semiconductor and pharmaceutical industries. The second development has been an increase in concern for the environmental effects of the dumping of hazardous waste materials in the sewer lines, as well as on land.

With regard to the purity of chemicals, it is evident that the purity of a liquid over a period of time is greater at the start of a process time period than it is at the end of that time period. As greater purity has become more and more important, it has become apparent that higher quality is produced using chemicals during the first part of the period when purity is greater, than at the end of the tolerable processing period when contaminants have been able to build up in the chemical liquid. As a consequence, in the specific case of the cleaning of semiconductor wafers using peroxydisulfuric acid, the wafers cleaned at the beginning of the process period have a higher quality than those which are cleaned at the end of the tolerable contaminant processing period.

With respect to the dumping of hazardous chemicals, public awareness coupled with recently passed hazardous waste chemical disposal laws, have made the disposal of hazardous chemicals extremely difficult as well as costly.

In addition, the necessity of periodic replacement of chemically pure liquids represents an increased cost of materials, increased labor costs, as well as a small but real risk of contamination or hazard to the personnel involved. Finally, there is the cost involved in shutting down a process for whatever time is required to replace the chemicals.

In addition, any time chemicals are stored or transferred, impurities are introduced which are intolerable for ultrapure requirements. For example, stabilizers often must be added to prevent decomposition of unstable compounds. Also, reaction with the containers during storage and transfer, although slight in most cases, often produces a contamination level in such liquids which is intolerable for ultrapure process requirements.

Manufacturing space available for semiconductor manufacturing is often limited and expensive. Moreover, local government codes often limit the amount of sulfuric or other acid which can be inventoried in any one container.

In the case of semiconductor wafer cleaning various chemicals can be used. One process utilizes hydrogen peroxide which must be shipped with stabilizers in order to prevent spontaneous decomposition. The stabilizers which are required to be used introduce impurities which will ultimately contaminate the wafers during the cleaning process.

Another process utilizes potassium or ammonium peroxydisulfate. Potassium peroxydisulfate commonly contains metal ions as impurities which produces a known problem with integrated circuits, particularly MOS circuits.

While ammonium peroxydisulfate could theoretically be made quite pure, such purity levels are not available on an economically attractive basis.

In light of the above difficulties in requirements for the use of ultrapure chemicals and the subsequent contamination and disposal requirements, it is desirable to provide a method and apparatus capable of maintaining purity of the ultrapure liquid throughout the course of the reaction which will avoid contamination buildup. In addition, it is desirable to provide a process and apparatus which avoid the need for the disposal of large amounts of hazardous chemicals. Finally, it is desirable to provide a process and apparatus which reduce processing costs by reducing the amount of chemicals required, reducing the number of personnel involved, increasing the safety of the personnel involved, and eliminating the frequent requirements for shutdown of the process for purposes of renewing ultrapure liquids.

One object of the invention is to provide a novel method and apparatus for distillation of liquids to remove soluble impurities and insoluble particles, especially particles having a diameter of less than 10 microns.

Prior art glass distillation columns are commonly spherical in shape, having a diameter of about two feet and a capacity of approximately 30 gallons. The output is about 600 ml per minute of sulfuric acid. The liquid boiling volume in the boiling pot is about 15 gallons providing a liquid/vapor boiling surface of about 3 square feet at the boiling surface and a heat transfer area of about 6.5 square feet.

The distillation column of the invention is preferably a cylinder of about 6 feet in overall height including a cylindrical bottom having a diameter of about 8 inches and a boiling liquid height of about 2 feet for the same throughput of 600 ml per minute. The boiling volume is about 5 gallons which is one-third of the prior art distillation column. However, the heat transfer area is about 5 square feet with a boiling surface area of about ⅓ square foot. This design saves about 1 foot in furnace diameter at the base when the heating element is included and reduces the inventory of boiling acid by one-third. This is a particularly desirable safety feature. Other features of this invention allow for improved system performance even with a smaller heat transfer area.

Nucleation sites are required to avoid bumping which can be very dangerous when acid is distilled since the acid can be forced out of the distillation column. Metal boilers are inherently rough which provides nucleation sites for boiling. However, metal boilers are unsuitable for the invention process since they introduce metallic contaminants. Most distillation in glass boilers generally utilize boiling chips in the form of rough ceramic inert granules to provide nucleation sites since the glass surface is extremely smooth and does not inherently provide nucleation sites. It was found that use of these chips was unsatisfactory as the chips scoured the glass over time and created particles which contaminated the sulfuric acid.

This problem is overcome by the distillation column of the invention. A particularly novel feature of the distillation column is the inclusion of porous fused quartz or other glass boiling rings which are spaced from and fused at selected points to the distillation column walls.

The preferred material for these boiling rings is composed of Quartz Scientific "TPL" ™ in the form of fused quartz which is formed by fusing silicon dioxide powder with heating from one side. This results in an inner surface which is smooth and glassy and an outer surface which is highly textured. The textured surface provides interstices for vapor nucleation. The resulting piece is sawed into rings and mounted in the distillation column spaced from the wall.

It was found that a particularly novel advantage of locating boiling rings spaced from the distillation column wall is that a novel smooth convective boiling pattern is created. Boiling with bubble and vapor formation takes place in the highest heat zone which is nearest the column walls. This is believed to cause a predominant circulation pattern wherein the vapor rises smoothly up the interior wall surfaces of the distillation column on both surfaces of the boiling rings. The resultant smooth convective flow reduces entrainment of contaminants, particularly soluble and insoluble particles of less than about 10 microns in size.

At the same time with the distillation column of the invention, cooler unvaporized liquid also rises to the surface but returns to the bottom of the column in the relatively cooler center portion. Not only does this feature insure smooth, energy efficient boiling but there is also a reduction in the boiler wall temperatures.

Wall temperatures are a direct function of the efficiency of heat transfer from the heating zone or furnace to the liquid since boiling cools the walls by absorbing the energy. The distillation column of the invention provides a higher efficiency of heat transfer than does the prior art method by causing boiling to take place at the wall due to the spaced boiling rings. This advantage not only reduces the required heat transfer area and energy costs but also provides a smooth convective boiling pattern which reduces entrainment of particles.

One of the most advantageous features of the distillation column of the invention is the ability to remove both soluble impurities and insoluble solid particles of less than about 10 microns.

In order to produce ultrapure liquids, it is particularly necessary to remove particles, particularly insoluble small particles in the range of one micron and smaller sized particles. When distillation is used as a method for purification, there are problems associated with the removal of small particles. This is due to the fact that the small particle, for example a particle of less than 10 microns in size, can be expected to be carried over by the vapor during distillation since such particles would have a mass/cross sectional area that would prevent gravity separation from the vapor flow.

Not only are the particles expected to be released into the vapor stream during the agitation caused by boiling, but also it would be expected that as the bubble forms the particle or particles would be carried to the surface on the bubble liquid interface and ejected into the vapor during the distillation. Thus, it would be expected that all small particles would be entrained in the rising vapor stream to be carried over to the product reservoir.

It is an object of the invention to provide a distillation apparatus and method which clearly separates small particles, especially particles of less than 10 microns, from the vapor distillate in contrast to the expected entrainment thereof.

A combination of features of the distillation column of the invention have made possible the effective removal of insoluble impurities and non-volatile solid particles having a size down to the limits of liquid particle counters, i.e. 0.2 microns.

One novel feature of the distillation column of the invention which is believed to contribute to particle removal includes in particular the use and location of the boiling rings which optimize smooth boiling at the liquid/vapor interface and provide efficient heat transfer resulting in fewer particles being expelled into the vapor stream. The resulting smooth convective flow of vapor bubbles upwardly along the walls and the downward flow of cooler liquid substantially centrally of the distillation column is also believed to be novel.

Another feature of the distillation column of the invention which is believed to contribute to particle removal is the provision of a packed column as an efficient counter current particle scrubber which enables the reflux stream to continually wash the rising vapor and particles back down the column.

Another feature of the distillation column of the invention is the provision of redirector rings which together with the packing cause comingling of the acid and vapor to effect further scrubbing of the vapor/reflux liquid streams. The redirector rings also direct condensed vapor to fall within the central area of the distillation column.

Still another novel feature of the distillation column of the invention which is believed to contribute to particle removal is the provision of a low net vapor velocity by sizing the distillation column with a relatively large diameter in relation to the throughput. This permits increased dwell time for rising vapor to be scrubbed by counter current downward flow of condensed liquid.

The use of glass in apparatus for distillation gives rise to problems which are unique to such use. These include among others, the brittleness of glass, and in the case of distillation of highly corrosive liquids the consequent risks involved if glass is broken. Moreover, glass is not flexible so special care and design are needed to provide joints which will flex and not break or leak upon expansion of glass during the relatively high distillation temperatures, for example 300° C.

The distillation apparatus of the invention provides a design which overcomes the above problems unique to glass and at the same time is of a relatively small size to limit the quantity of corrosive liquid which must be handled. This reduces the risk inherent in the event of breakage and at the same time operates within existing city code limitations with respect to the total amount of corrosive material which can be inventoried.

SUMMARY OF THE INVENTION

The novel process and apparatus provided by this invention overcomes the deficiencies of the prior art by continuously withdrawing used acid/oxidant solution from the process stream, subjecting it to purification techniques, and then reintroducing it to the process stream to maintain a constant ultrapure liquid concentration having a known purity.

With respect to the production of ultrapure liquids for semiconductor wafer cleaning, the process begins with an oxidant solution of ultrapure sulfuric acid and peroxydisulfuric acid in ultrapure water. During the course of the acid cleaning, the peroxydisulfuric acid gradually degenerates or degrades to sulfuric acid and water. This degraded oxidant solution comprising sulfuric acid and water is continuously withdrawn from the process stream and repurified. Peroxydisulfuric acid is generated in-situ from repurified sulfuric acid via the action of an electrochemical cell. The regenerated oxidant solution together with repurified sulfuric acid are continuously added to the wafer cleaning bath to maintain a constant volume and concentration of oxidant solution.

The purification process is continuous, permitting three to four acid changes per cleaning bath. This is based on a 60 liter per hour flow rate, a bath size of 4 liters, and a cleaning time of 10 minutes. This amounts to approximately 300 cc to 500 cc of clean acid per wafer by the new process compared to 10 cc to 50 cc of clean acid per wafer in the current stagnant cleaning bath prior art processes. Since the solution is reprocessed, spray processes maybe optimized by increasing the volume of acid per wafer. The current art of spray and discard limits the acid volume for economic reasons.

Since the chemicals used are continuously purified, only small amounts of contaminated liquids require disposal. In addition, only small amounts of makeup acid or makeup ultrapure liquids are required to keep the volume constant.

Since no stabilizers are used and only occasional transfer and storage containers are necessary, the introduction of impurities is minimized.

Standard commercially available 90%-98% sulfuric acid contains 10-100,000 particles/cc of acid. These particles have a size of 1-15 microns. Trace impurities primarily in the form of cations are also present in the amount of 10 PPB. Both particles and trace elements constitute undesired impurities on semiconductor wafers. The process of the invention reduces particle concentrations of 1 micron size and greater to <5/cc and trace impurities <10 PPB.

Particles, particularly particles less than 10 microns, are removed by a novel distillation process and apparatus whereby boiling nucleation sites are provided near the walls of the distillation column. Thus, heat applied to the walls is efficiently transferred to the liquid causing smooth boiling and upward convection of vapor bubbles along the interior walls. At the same time the distillation column is provided with means to direct condensed vapor and to distribute the liquid more evenly through the packing.

A particular feature of the process avoids the pumping of the main stream of reprocessed ultrapure liquids, avoiding the introduction of pump induced contamination inherent in mechanical pumps. Pumping is employed during parts of the reprocessing process for only about 4% of the reprocessing stream. Non-contaminating pumping and delivery systems can also be used.

In addition, since the process is continuous, it is possible to continuously monitor the purity of the process chemicals in line. This is in contrast to prior art procedures which permit only the monitoring of lot samples of incoming chemicals since analysis of the chemicals at the use station is impractical. Since only lot samples are used, there is always the possibility that a single batch of incoming chemicals is contaminated which would not be evident from the prior art method of testing only lot samples. This can result in the contamination of wafers during the wafer cleaning process which will not be immediately evident. The invention method assures purity throughout the process.

While the invention is particularly described with respect to the purification of ultrapure liquids, particularly an oxidant solution of sulfuric acid, peroxydisulfuric acid, and ultrapure water for use in semiconductor wafer cleaning processes, it is contemplated that the invention is applicable to the continuous on-site purification of other chemicals especially sulfuric acid to ultrapure standards. Such purification is intended to include but is not limited to, for example, mineral acids and solvents. These chemicals might be used but are not limited to such industries as the semiconductor manufacturing industry, pharmaceutical manufacturing, pc board manufacturing, magnetic tape or disk manufacture, laser disk manufacture, metal finishing industries, or any other application which requires purified chemicals.

Similarly, the exact process for the continuous on-site chemical reprocessing of the ultrapure liquids will involve various chemical process technologies, depending on the nature of the ultrapure liquid to be continuously repurified. Such process technologies can include, but are not limited to distillation, such as atmospheric and vacuum distillation, electrochemical regeneration, electrodialysis, filtration, centrifuging, ion exchange, gettering, sublimation, and adsorption.

The invention is specifically described with respect to the integration of these processes and their process conditions to the continuous regeneration and repurification of an oxidant solution of sulfuric acid, peroxydisulfuric acid, and ultrapure water for use in cleaning semiconductor wafers.

A system comprising apparatus to conduct the repurification process of the invention is also provided. This system includes novel distillation apparatus whereby contaminants in the form of soluble impurities and insoluble particles can be removed, a novel water-/acid stripper which separates acid from water and volatile components, and a novel electrical cell where chemicals are generated for the wafer cleaning process, and an integrated automatic chemical make-up.

The novel distillation apparatus is capable of removing particles from less than 10 microns to below 0.3 microns or less in size. Moreover, the distillation column is sized especially tall so that the product can be gravity fed to the use point. This avoids the need for a pump which would be a source of contaminants. Operating costs are also reduced thereby.

A computer controlled valve can be used to automatically quench boiling if a rapid system shutdown is required. This is achieved by discharge of cold liquid from cooled product inventory. Thus, a significant safety feature is provided in case a rapid shutdown is required.

The efficiency of the novel distillation column coupled with the low impurity feed stream avoids the need for continuous withdrawal of the dirty acid in the bottom of the distillation column.

The distillation column of the invention includes porous fused quartz boiling rings which are spaced from and fused at selected points to the distillation column walls. The provision of attaching the boiling rings in a location spaced from the distillation column walls allows boiling to take place in the highest heat zone and causes the vapor to rise smoothly up both sides of the boiling rings near the interior surface of the distillation column while the cooler unvaporized liquid also rises to the surface but returns to the bottom of the column in the relatively cooler center portion. This feature insures smooth, energy efficient boiling and a reduction in the boiler wall temperatures to provide a higher efficiency of heat transfer due to the spaced boiling rings.

The distillation column of the invention includes a packed column and redirector rings as an efficient counter current particle scrubber which enables a reflux stream to continually wash the particles back down the column. A reflux condenser head or a total condenser which provides a return overflow of condensed product causes a counter current flow of vapor and liquid through the packing and redirector rings.

Finally, the distillation column of the invention provides a low net vapor velocity for small particle removal since the distillation column is sized with a relatively large diameter in relation to the throughput.

As used herein and in the appended claims, the term "nucleation sites" refers to a crevice, pore, or interstice where a gas bubble forming within a liquid can nucleate and grow to a size permitting bubbling to the liquid surface.

DESCRIPTION OF THE DRAWINGS

FIG. 1 shows a block diagram of the system of the invention;

FIG. 2 shows a detailed schematic view of the stripper 1 shown in the block diagram of FIG. 1;

FIG. 3 shows an enlarged view of the inert gas bubbler manifold of FIG. 2;

FIG. 6 shows a detailed schematic view of the cooler 5 shown in FIG. 1;

FIG. 7 shows a detailed schematic view of the diluter 7 and water cooler 9 shown in the block diagram of FIG. 1;

FIG. 8 shows a schematic sectional view of the wafer cleaning process station 11;

DESCRIPTION OF THE PREFERRED EMBODIMENTS

Figure 18:
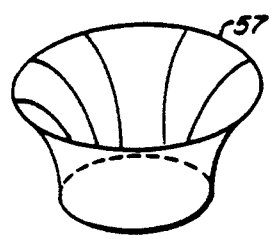
FIG. 18 shows a perspective view of one of the redirector rings emplaced in the distillation column of FIG. 2.

Referring now to FIG. 1 there is shown a block diagram of the process of the invention. The process is continuous, and, thus, for convenience a description of the process will begin at the semiconductor wafer cleaner shown in Block 11.

An oxidant solution bath is first prepared and is comprised of at least 0.05M $H_2S_2O_8$, 92% by weight of $H_2SO_4$, and the balance ultrapure water. The temperature is typically about 80° C. to about 150° C. Here, cassettes of wafers are subject to acid cleaning to remove any impurities therefrom. This is normally accomplished by immersion in the bath, but other means such as a spray can also be used. The cleaning can be augmented by means of ultrasound and megasound if desired ($10^{+3}$–$10^{+6}$ Hz).

During the wafer cleaning process, the oxidant solution which is used to clean the semiconductor wafers is continuously withdrawn and circulated throughout the system. The oxidant solution is withdrawn continuously by gravity overflow to a surge tank 12 where it is first directed to a fluoride removal column or tank 14. The purpose of the fluoride removal column 14 is to remove any fluoride ions which are present as a contaminant on the wafers as a result of previous process steps.

It is desirable to remove the fluoride ions for two reasons. The first is that it is an undesired impurity in the acid solution, and secondly, it is very destructive to many types of materials, especially fused quartz glass which is the preferred material for this apparatus.

From the fluoride removal column 14 the oxidant solution containing acid and water is directed to the stripper shown in block 1. Here, the solution is heated to cause the water to vaporize. At the same time an inert gas such as nitrogen is bubbled through the solution to remove volatile impurities and water vapor. The water vapor and entrained impurities escape to condenser 13 and any acid vapor which is also passed into condenser 13 is condensed and returned to the surge tank 12. At the same time, the water vapor and impurities leave the system via an exhaust duct.

The acid stripped of the water in the stripper 1 is then directed to distillation column 2 where it is heated to a very high temperature, causing it to vaporize. This produces a very pure vapor separated from particles and other contaminants since the distillation column includes special boiling rings, packing materials, redirector rings as well as a reflux head. The acid vapor then passes from the distillation column 2 to the condenser and cooler 3 where it is condensed and cooled prior to being directed to a stream splitter 4.

The stream splitter 4 sends a major portion amounting to approximately 90% to 98% of the purified acid stream directly to the semiconductor wafer cleaner 11. The remaining portion of the stream amounting to about 2% to about 10% is directed to a water cooler 5 prior to being directed to a particle counter 6. At the particle counter 6, the purity of the acid is measured for quality control purposes.

The acid from the particle counter 6 is then directed by means of a metering pump 17 to a diluter shown in block 7. Here it is mixed with about 40% to about 70%, and most preferably 50% by weight of ultrapure water.

The heat of solution causes the temperature of this mixture to rise. It is cooled primarily by a water jacket within diluter 7 which reduces the temperature to about 15° C. to abut 25° C. before being directed to electrical cell 10 (E-cell). A small portion of the liquid stream is diverted after dilution to an atomic absorption spectrometer 16 for trace analysis.

At E-cell 10, the preferably 50% by weight sulfuric acid/water solution is changed to an oxidant solution of at least 0.5M peroxydisulfuric acid and 50% by weight sulfuric acid, with the balance ultrapure water. The oxidant solution is then sent to the semiconductor wafer cleaner 11 where it is mixed with main stream incoming purified sulfuric acid from the condenser and cooler 3. Any excess or overflow is directed to the surge tank 12.

At the semiconductor wafer cleaning station 11, the process loop is complete and the reprocessing proceeds continuously.

The relatively unstable nature of the oxidant solution produced according to the process of the invention precludes its storage for long periods of time. The fact that the oxidant solution is freshly generated continuously constitutes a particular feature of the invention and constitutes a significant step over prior art processes.

While the process is particularly designed for continuous reprocessing of the oxidant solution, certainly the process can be applied for continuous batch repurification. In this instance, oxidant solution withdrawn from the wafer cleaning station could be held in at least one reservoir. If at least two reservoirs are used, one could be repurified according to the invention process while the other reservoir could be filling with degraded oxidant. The repurification process would then alternate between the two or more reservoirs to always provide a source of pure oxidant solution.

Each of the blocks shown in FIG. 1 are discussed in greater detail below.

THE SURGE TANK

During the semiconductor wafer cleaning process, the preferred oxidant solution comprised of at least about 0.05M peroxydisulfuric acid, about 92% by weight sulfuric acid, and the balance ultrapure water becomes degraded during the process. The wafer bath continuously overflows to the surge tank 12. In addition, any overflow from the condenser and cooler 3, the stripper condenser 13, and the anolyte reservoir 120 or catholyte reservoir 118 of the E-cell 10 is directed to the surge tank 12. Moreover, any needed make up sulfuric acid is added to the process stream from the acid make up tank 18 at this point. This is necessary to keep the volume of the process stream constant since small amounts of the stream are continuously being removed in the form of waste from the stripper 1, the distillation column 2, and dragout from the bath 11.

A pump 15 continuously pumps acid solution from the surge tank 12 to the fluoride removal tank 14. This can be any standard pump, preferably a "Teflon" (TM) pump, which is made of materials resistant to acid corrosion. "Teflon" (TM) (polytetrafluoroethylene) is inert to the cleaning solution and for this reason is preferred.

FLUORIDE REMOVAL COLUMN

The fluoride removal tank or column 14 is not detailed in the drawings. It can be any standard chamber in the form of a tank or an elongated column filled with activated alumina (aluminum oxide) beads or other chemical reactive with $F^-$ ions. The $F^-$ ions are undesired in the reprocessing method due to their reactivity with fused quartz glass of which much of the apparatus is composed. The fluoride removal tank or column 14 has an inlet and an outlet for the passage of acid in and out of the tank. From the fluoride removal tank or column 14, the oxidant acid/water stream is .passed to the stripper shown in block 1 of FIG. 1.

THE STRIPPER

The stripper can be seen in greater detail in FIG. 2. As shown, a plurality of heating coils 20 in an insulated block 22 surround a large diameter vessel or fused quartz glass tube 24. Within the fused quartz glass tube 24 are a number of fused quartz glass inlet tubes. The oxidant acid/water solution is introduced into the bottom of the tube 24 by means of inlet tube 26, At the same time, an inert gas such as nitrogen gas is introduced through a fused quartz glass tube 28 which enters near the top of the tube 24 and extends downwardly into the tube 24 to a bubble manifold 30.

The manifold 30 is shown in detail in FIG. 3. As shown, the inlet tube 28 for the gas terminates in the manifold 30 which is in the form of a tubular circle having radial cross-members 31. A plurality of perforations 33 permit the gas bubbles to escape into the solution.

A temperature probe can be inserted into a closed fused quartz glass tube 32 to permit the measurement of the temperature within the tube 24 without invading the interior contents of the stripper 1. Another tube 34 permits the removal of the stripped acid from the stripper tube 24. The tube 24 also includes an outlet passage 36 near the top which opens into a condenser tube 38 corresponding to block 13 of FIG. 1. The condenser tube 38 has an outlet passage 40 for the escape of water vapor and nitrogen gas and an exit tube 42 at the bottom thereof to drain away condensed acid.

The condenser tube 38 contains a coiled spiral tube 44 which is sealed with respect to the interior of the condenser tube 38. Cooling fluid, preferably silicon oil or water, is circulated through coils 44 at a temperature of about 33° C. to about 80° C. In addition to the spiral tube 44, condenser tube 38 is packed with Raschig rings 39 which are ¼ inch diameter fused quartz glass tubing which has been chopped into ¼ inch lengths.

In operation, the oxidant acid/water solution at a temperature of about 100° C. continuously arriving from the fluoride removal tank 14 enters the quartz tube 24 by means of inlet tube 26. At the same time, nitrogen is continuously bubbled down through tube 28 to manifold 30 where the bubbles rise through the acid/water liquid contained therein.

The heating coils 20 in the insulated block 22 which surround the fused quartz glass tube 24 continuously heat the oxidant acid/water solution to approximately 280° C. which is below the boiling point of the acid. This heat and the partial pressure of nitrogen causes the water and a small portion of the acid to vaporize.

At the same time, the bubbles of nitrogen gas which pass upwardly through the oxidant acid/water solution attract molecules of water vapor and low boiling compounds such as $CO_2$ to the bubble surfaces. These volatile impurities and minimal acid vapor are then continuously carried off at the top of the tube 24 by the gas bubbles which upon penetrating the surface form a fine mist.

This mist contains carbon dioxide, water vapor and other volatile components which are continuously removed from the acid solution. The bubbles then, carry these water vapor molecules as they rise through the oxidant acid/water solution and escape through passage 36 to condenser 38. The remaining liquid contains more concentrated acid. In this manner, most of the water is effectively stripped from the oxidant acid/water solution originally introduced into the tube 24.

In the condenser 38, the water vapor and the nitrogen gas rise and escape through passage 40. At the same time, cooling fluid such as silicone oil or water which is circulated through the sealed tubing condenser coils 44 within the condenser 38 together with the packing of the Raschig rings 39 cools any acid vapor to a point below its boiling temperature, causing it to condense and pass out of the condenser 38 through drain 42 which is then directed to surge tank 12. The condenser coils are kept at a temperature which is greater than the dew point of water and less than the boiling point of water to insure that the water will escape in the form of a vapor and the acid vapor will be condensed and returned to the surge tank 12. Without the Raschig rings 39 and the condenser coils 44, acid vapor would exit with the water vapor causing an overall loss of acid.

The cooling fluid such as water or silicone oil which is circulated through tube 44 within the condenser tube 38 is cooled in a heat exchange unit not shown or by any other suitable means. In most instances this is practically accomplished by means of ambient temperature city water. The same method is used for cooling oil and cooling water which are circulated for cooling purposes in other parts of the apparatus as subsequently described.

The nature of the cooling fluid is not critical and can comprise among others water or silicone oil. Preferably the cooling oil is a silicone oil which has a boiling point between 400° C.–500° C. Such a high temperature boiling point oil is necessary to be able to cool sulfuric acid which has a boiling point of 338° C.

Although nitrogen gas is preferred for use in the stripper 1, other inert, clean, dry purified gases can be used in place of nitrogen. Such inert gases include but are not limited to air, helium, neon and argon.

At the stripper 1, the acid which has been stripped of the water exits continuously from the tube 24 through exit tube 34. It is then directed to the distillation column 2 and cooler and condenser 3 of FIG. 1 which are detailed in FIG. 4.

THE DISTILLATION COLUMN

Figure 4:
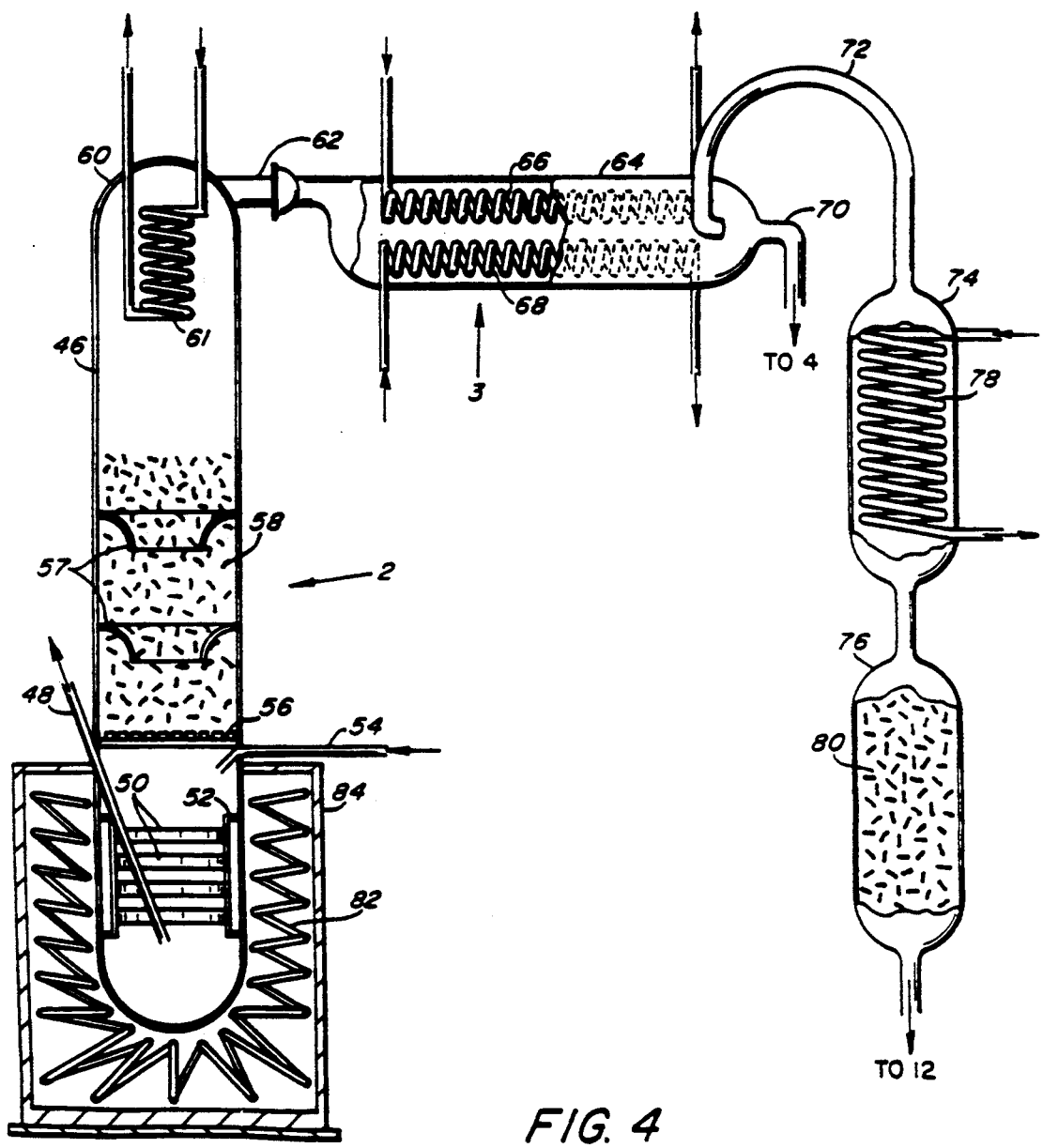
FIG. 4 shows a detailed schematic view of the distillation column 2 and condenser and cooler 3 shown in the block diagram of FIG. 1.

As shown in FIG. 4, the distillation column 2 is comprised of a large diameter fused quartz glass distillation tube 46. The distillation column 46 is surrounded at its base by heating coils 82 disposed in an insulated block 84. This provides the necessary heat to the distillation column 46.

In order to aid in the boiling process, a series of "snoball" quartz rings 50 are disposed annularly approximately ¼ to about ½ inch from the wall of the fused quartz glass distillation tube 46 by attachment to several fused quartz glass support rods 52. The rods 52 are disposed vertically around the interior peripheral surface of the fused quartz glass tube 46 for purposes of holding the quartz rings 50.

The quartz rings 50 are preferably comprised of a special type of quartz called "snoball" quartz which refers to its appearance. Initially the "snoball" quartz is in the form of small beads of quartz which have a frosted appearance. The rings 50 are formed of a plurality of these beads which have been only partially melted together. The result is a perforated structure having a plurality of interstices within the rings to act as boiling sites for the boiling acid. A preferred material for the quartz boiling rings 50 is Quartz scientific "TPL" ™.

The quartz rings are very important to the distillation column to aid in the boiling of the acid. Commonly used boiling chips were initially tried and found to be less satisfactory. The boiling chips moved around so much in the column that they resulted in a scouring effect on the column surfaces. This is undesirable since it can produce contaminants from the fused quartz glass. Other nucleation enhancement materials such as sintered glass frits can also be used.

Figure 20:
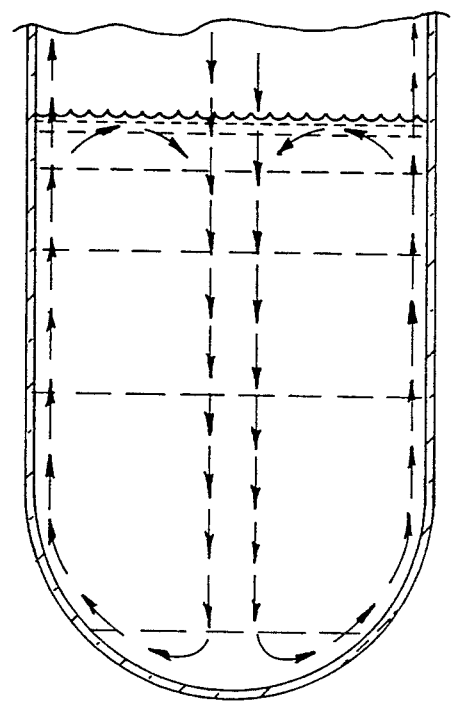

Another major advantage provided by the boiling rings 50 is that there is more efficient heat transfer from the wall to the liquid. The boiling rings 50 are placed close to the walls so that the boiling of the liquid acid occurs near the source of heat. Bubbles of vapor form within the interstices of the boiling rings and the bubbles rise on both sides of the rings. This causes a novel convective flow to occur which is illustrated schematically in FIG. 20.

As the boiling liquid and vapor rise along the walls of the distillation column, the cooler liquid flows downwardly in the central area of the distillation column.

Thus, there is provided smooth convective flow and smooth boiling in a novel manner.

The acid enters the fused quartz glass distillation tube 46 at opening 54 where it is introduced near the vicinity of the quartz rings 50. A smaller diameter tube 48 extending from one side of the tube 46 near the bottom is used for purposes of removing acid constituting waste.

Above the quartz rings 50 is a grid or packing stop 56. As detailed in FIG. 5, the grid 56 is in the form of a cross hatched fused quartz glass circular disk which is attached to the walls of the quartz tube 46. The grid 56 extends across the tube 46 in a direction perpendicular to the central axis of the tube 46.

Within the quartz tube 46 above the grid or packing stop 56 are axially disposed redirector rings 57 in a form having a generally truncated funnel shape with a large delivery opening as shown in FIG. 18. Also above the packing stop 56 and within and surrounding the redirector rings 57 there is disposed packing comprised of Raschig rings 58 which extend nearly to the top.

Raschig rings are comprised of ¼ inch diameter fused quartz glass tubing which has been chopped into ¼ inch lengths across the central axis. Other types of packing can be used in place of the Raschig rings including among others Lessing rings, Berl saddles, partition rings, spiral rings and single and multiple turned helices of thin quartz glass. The packing is preferably of fused quartz glass. Quartz marbles could be used in place of the Raschig rings 58, if desired, but they are less preferred.

The purpose of the Raschig rings 58 and redirector rings 57 are to cause the considerable refluxing of the acid during the distillation process. The redirector rings are also important in directing the condensing acid vapor to the central portion of the distillation column. This further drives the cooler liquid acid from the center to the walls where boiling takes place in a smooth convective manner.

The refluxing of the acid is further enhanced by means of a reflux condenser head 60 located at the top of the quartz distillation column 46. It is comprised of a spiral tube 61 which is sealed with respect to the interior of distillation column 46.

The spiral tube 61 contains cooling a cooling fluid such as water or an oil, preferably silicone oil, and is located in the vicinity of the outlet passage 62 which leads to cooler and condenser 3. The cooling fluid such as water or oil has the effect of condensing acid vapor which reaches it so that there is a continuous scrubbing action of the acid, so that only the purest acid vapor manages to escape through passage 62 to the cooler and condenser 3 leaving behind particles and other contaminants.

The effect of the reflux condenser 3, the redirector rings 57, and Raschig rings 58 within the column 46 as shown is to remove contaminants, especially particles. For every 4000 particles present prior to distillation there will be only 1 particle present after distillation. Thus, the distillation process removes not only soluble contaminants but insoluble particles as well from the sulfuric acid. This represents a significant and novel step in the art. Thus, the distillation column itself is a novel feature of the invention.

The cooler and condenser 3 shown in FIG. 4 is comprised of a large diameter fused quartz glass tube 64 disposed horizontally and having two substantially parallel spiral sealed tubes 66 and 68 disposed therein, although more tubes can be used as needed to provide increased cooling surface area. Each of the tubes 66 and 68 contain circulating cooling fluid such as water or oil which is pumped through the tubes from a heat exchanger not shown as described for the stripper condenser.

The upper cooling coil 66 acts to condense the acid vapor as it reaches the cooler and condenser 3. The lower disposed cooling coil 68 acts to cool the acid liquid as it is condensed so that it is further cooled prior to its exit from outlet 70. Upon exiting through outlet 70 the liquid acid is directed to stream splitter 4 as indicated in the block diagram of FIG. 1.

The quartz tube 64 also contains a vent 72 in the form of a small diameter tube 72 which extends partially into the quartz tube 64 in one direction and in the other direction is in communication with a condenser 74. The condenser 74 communicates with a packed column 76. The condenser 74 contains a sealed spiral coil of fused quartz glass tubing 78 through which cooling water is circulated for purposes of cooling any vapor which escapes into the condenser 74 through vent 72. This vapor is further condensed by means of passage through packed column 76 which is comprised of a fused quartz glass tube filled with a packing material 80. From the packed tube 76 any condensed acid liquid is directed to the surge tank 12 for recirculation through the system.

Figure 19:
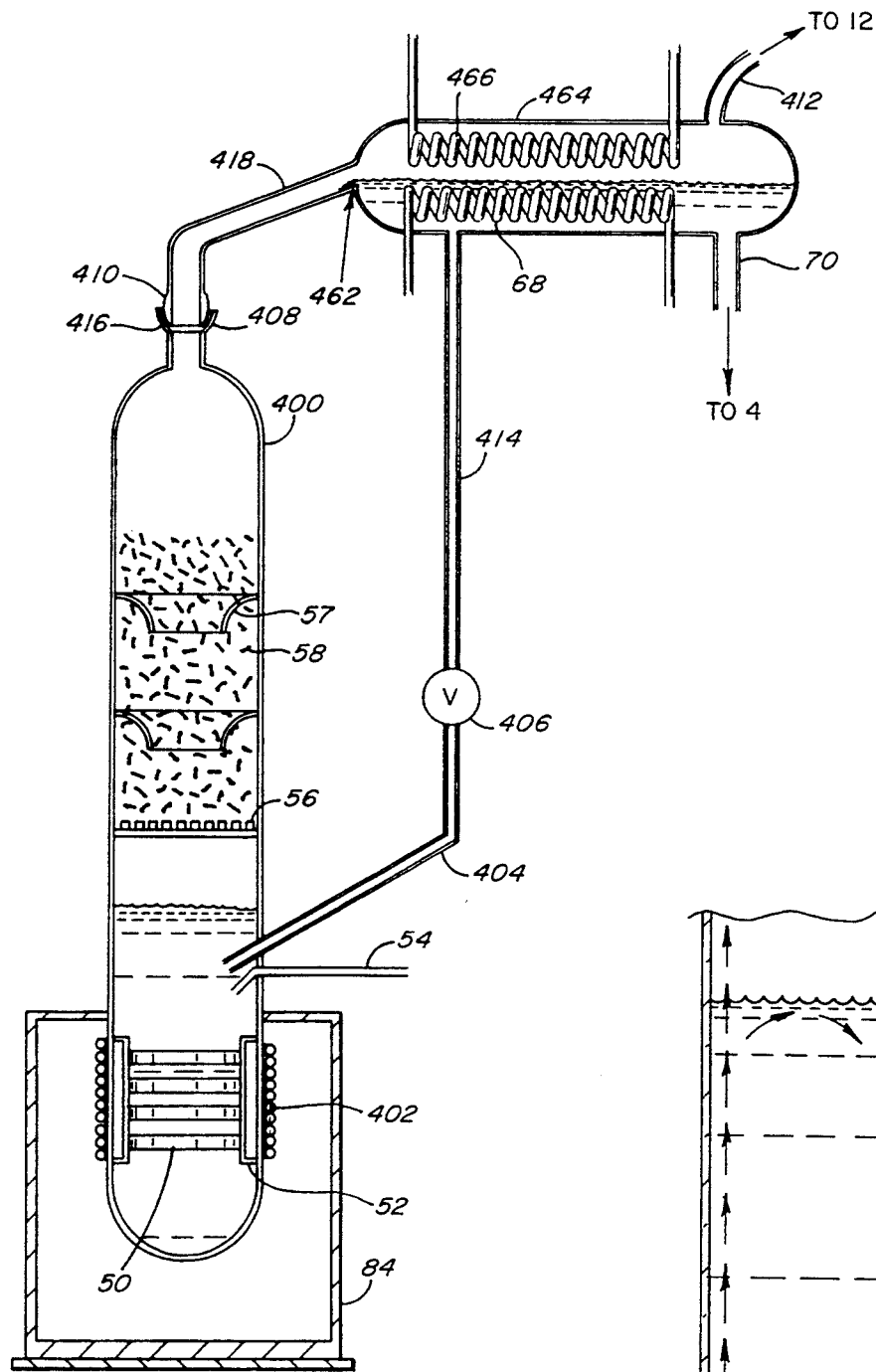
FIG. 19 shows a detailed schematic view of another embodiment of the distillation column; and, FIG. 20 shows a schematic representation of the smooth, convective flow pattern of rising vapor and falling reflux liquid which takes place during distillation according to the invention method using the distillation apparatus of FIGS. 4 and 19.

Another preferred embodiment of the distillation column of the invention is shown in FIG. 19. As shown, the elongated distillation column 400 similar to the distillation column 2 is comprised of a large diameter fused quartz glass distillation tube 400. Within the lower portion of the distillation column 400 are disposed a plurality of "snoball" quartz "preferably TPL" ™ quartz boiling rings 50 which are disposed annularly and spaced about one half inch from the wall of the quartz glass distillation column 400. The quartz boiling rings 50 are attached to several fused quartz glass support rods 52 which are disposed vertically around the interior peripheral surface of the fused quartz glass distillation column 400. The quartz rings 50 are identical with the quartz rings 50 shown in FIG. 4 and described above.

The distillation column 400 is disposed within an insulated block 84. Surrounding the lower vertical portion of the distillation column 400 are heating coils 402. It is preferred that the heating coils 402 be disposed substantially coextensively with the boiling rings 50 in order to confine boiling to the vicinity of the walls and avoid boiling at the bottom of the column 400.

Acid to be distilled is introduced through opening 54, preferably below the liquid level and within the vicinity of the quartz boiling rings.

Figure 5:
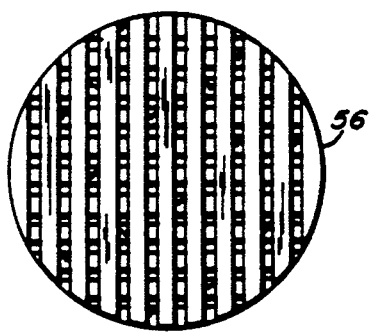
FIG. 5 shows an enlarged view of the packing stop shown in FIG. 4.

Disposed above the boiling rings 50 and above the liquid level within column 400 is a packing stop 56 identical with that shown in column 46 of FIG. 4 and detailed in FIG. 5.

As in the distillation column of FIG. 4, there are a plurality of axially disposed redirector rings 57 which are disposed above the grid packing stop 56. The redirector rings 57 have a generally truncated funnel shape oriented with the large opening facing upwardly and the smaller opening oriented downwardly exactly as shown in FIG. 18.

Above the packing stop 56 and within and surrounding the redirector rings 57 there is disposed packing in the form of Raschig rings 58 which extend near the top of the column 400. These Raschig rings are identical with the Raschig rings which are used in the distillation column of FIG. 4.

In this embodiment of the distillation column there is no provision for the removal of waste acid. It has been found that it is not necessary to remove waste acid since the distillation column can be operated as long as six months to a year without the need for the removal of bottoms product. This is due to the efficiency in removing soluble impurities and insoluble particles. The actual period of operation before removal of waste will depend on the process for which the purified acid is being used.

The distillation column 400 is provided with a ball joint at the top including an open rounded neck 408 into which is inserted a ball 410 having a groove therein not shown for seating of a Teflon O-ring 416. The ball 410 is attached to a condenser 464 by means of a quartz tube 418.

The quartz tube 418 is disposed at a downward angle from the condenser 464. Vapor which condenses within condenser 464 fills the base of the condenser. When the level of condensed cooled liquid within condenser 464 reaches a certain height, the liquid overflows the point 462 where the tube 418 is attached to condenser 464 which acts as a weir. This cooled liquid acid falls back down the tube 418 to provide a reflux stream which washes the rising vapor within the distillation column 400. This combined reflux action is particularly effective in removing particles and other contaminants in conjunction with the redirector rings 57 and Raschig rings 58 within the distillation column 400.

By comparison with the distillation apparatus of FIG. 4, condenser 464 and the sloping tube 418 which carry overflowing condensate from condenser 464 replaces the reflux condenser head 60 shown at the top of the quartz distillation column 46 of FIG. 4. However, the distillation process remains the same.

In the embodiment shown in FIG. 19 the condenser 464 is similar to that shown in FIG. 4 except for the connection to the distillation column.

There is a particularly novel safety feature which is provided in the embodiment of FIG. 19. This is the provision of an automatic computer controlled method for quick cooling of the distillation column in an emergency. A conduit 414 which is in communication with condenser 464 contains a cooled product can be sent to the distillation column 400 by opening of valve 406. This permits passage of cooled product through conduit 404 which enters the column 400 beneath the liquid level within the column 400. Entry of the cooled liquid product immediately quenches the distillation process by reducing the temperature.

The valve 406 can be computer controlled to automatically quench boiling for rapid system shut down. Thus, the cold liquid from the cooled product inventory can rapidly reduce the temperature within the column 400 to below boiling temperature. This feature is particularly desirable for the use in a glass distillation column.

Another feature of the embodiment of FIG. 19 is the elimination of the condenser 74 and the packing column 76 as shown in FIG. 4. In the embodiment of FIG. 19, any vapor produced within the condenser which does not condense is directed to the surge tank 12 through tube 412 while the cooled condensed acid liquid is sent directly to the stream splitter 4 without passing through the condenser 74 and packed column 76 which are not needed.

With respect to the embodiment of FIG. 4, in operation the acid stripped of water from stripper 1 continuously enters the distillation column 46 at inlet tube 54 near the bottom of the distillation column 46. Heat is continuously applied to the quartz tube 46 by means of the heating coils 82 to effect continuous boiling of the acid. The temperature of the acid is maintained at approximately 300° C.–330° C. Boiling of the acid is aided by means of the quartz boiling rings 50 which are present to prevent excess bubbling and provide smooth boiling and convective flow and efficient heat transfer through the walls of the distillation column. Boiling occurs along both sides of the boiling rings 50 so that hot acid and vapor bubbles rise along the interior walls of the distillation column while the cooler liquid flows downwardly in the central area of the column.

The packing with the Raschig rings 58, the redirector rings 57, and the reflux condenser 60 act to direct the condensing acid vapors down the central area of the column 46 to continuously scrub the acid vapor removing soluble and insoluble particles and other contaminants downwardly to produce an especially ultra highly purified acid vapor which continuously rises and escapes through passage 62 to the cooler and condenser 3.

The vapor which does not escape through outlet passage 62 is purified by the effect of the repeated condensation and re-evaporation on the column packing 58 in conjunction with the redirector rings 57 and the refluxing liquid. The reflux head 60 augments this action by condensing a portion of the sulfuric acid vapor. The resulting liquid returns to the boiling acid in a downward direction which acts to scrub the vapor by means of the counter action between the upstream vapor of the volatile and particulate impurities contained therein. Ideally, this combination results in a reflux of at least 50%.

By utilizing the embodiment of FIG. 19, the reflux head 60 is replaced by the overflow tube 418 and the condenser 464. In other respects the action is the same to scrub the impurities especially insoluble particles of less than 10 microns from the rising acid vapor.

The influx of acid and its subsequent distillation produces near the bottom of the column 46 a concentration of contaminants including particles which have been separated from the acid. This more highly contaminated acid can be removed continuously as waste from the bottom of the column 46 by means of small diameter tube 48.

However, it is preferred not to remove the bottom product except after several months of operation and then by shut down of the distillation process. It has been found that the operation of the column is so effective that removal is needed only after a considerable period of operation. Moreover, by eliminating this step there is the avoidance of the introduction of new particle contaminators. Thus, the embodiment of FIG. 19 does not provide for removal of waste acid.

In the cooler and condenser 3 of FIG. 4 the vapor is condensed and cooled to a process temperature in the range of about 100° C. to about 150° C. A reservoir of ultrapure clean acid at a constant elevation or head pressure is thereby produced.

It is preferred to use a relatively tall distillation column 46 to allow for elevation of the acid without the use of a pump. In this manner, the purified acid can be moved by means of gravitational force to the wafer cleaning station 11. The need for a pump can thus be avoided and the consequent possible contamination which can be introduced by the use of pumps.

While the invention is described with respect to use of only fused quartz glass, it should be understood that the invention and particularly the distillation apparatus are not limited thereby. The actual selection of the material for the distillation apparatus will depend upon the type of liquid to be purified and the type of contaminants and particles to be removed. Thus, it is contemplated that other materials than glass including among others stainless and other specialty metals can be used.

In like manner, while a distillation column is preferred as illustrated in the drawings, the invention is not limited by the actual configuration of the distillation chamber. Similarly, while the nucleation rings shown in the drawings are spaced from the walls, the invention is intended to include the provision of the nucleation sites adhered directly to the walls of the distillation chamber or be integral therewith. The important feature is to provide nucleation sites proximate to the walls to effect a predominant smooth, convective circulation pattern wherein bubbles form and rise proximate the walls of the distillation chamber with a downward smooth convective flow of cooler liquid substantially centrally of the distillation chamber. Thus, different configurations of distillation chambers and different methods of providing nucleation sites are a part of this invention if this pattern of boiling is provided.

The distillation method and apparatus of the invention are intended for removal of dissolved impurities and insoluble particles from fluids. Thus uses other than for purification of acids such as sulfuric acid are contemplated. The invention is not limited to the liquids to be purified. Thus, any fluids capable of distillation are contemplated for purification according to the invention. Also, while the distillation method and apparatus are shown for use in a continuous process, batch processes can also be used without departing from the scope of the invention.

Using the distillation apparatus and distillation method of the invention, it has been found that within practical limits that it is desirable to provide a low net vapor velocity through the distillation column. With a high vapor velocity, more particles are entrained. For the distillation apparatus shown in FIGS. 4 and 19, excellent results have been obtained with a total of about 700 cc of liquid sulfuric acid being produced per minute. The reflux ratio is about 0.2 for a total of 840 cc of liquid per minute being boiled and moved through the column as vapor. This was obtained using a distillation column having a diameter of 8 inches, a height of 6 feet with 16–18 inches of liquid. Above the liquid there are 6–8 inches of free space to the packing stop, about 18 inches of packing and redirector rings and the balance is free space.

THE STREAM SPLITTER

From the condenser and cooler 3 the acid stream continuously exits at 70 to the wafer cleaning station 11 and to the cooler 5. This is not shown in the drawings but can comprise any convenient means. For example, two separate ports from the condenser and cooler 3 with valve means can conveniently accomplish this. Alternatively, a series of valves which will split the stream into two smaller streams can be used. Preferably, about 80% to about 98% by volume of the stream is sent directly to the semiconductor wafer cleaner 11, while about 2% to about 20% is diverted for electrochemical treatment. Thus, a major portion of the stream is sent directly to the wafer cleaner 11 while a minor portion is processed further. The actual proportions of the stream are dictated by the requirements of the wafer cleaning bath. Other ranges can be used if desired. The exact amount should not limit the scope of the invention. The change of the purified acid liquid from sulfuric acid to peroxydisulfuric acid is effected by reaction in the electrochemical cell 10.

THE COOLER

From the stream splitter 4, the diverted smaller stream comprising preferably about 2% to about 20% by volume of the stream is continuously directed to a cooler 5 which cools the hot process acid to approximately room temperature or about 25° C. This temperature is suitable for the next analyzing step at block 6 shown in FIG. 1.

The cooler 5 detailed in FIG. 6 is in the form of a large diameter Teflon (TM) vessel 86 having a circumferential flange 83 spaced from its top opening. A lid 81 having a flanged top 91 fits over the top of the vessel. A plurality of bolts 85 pass through the flanged top 91 of the lid 81 and the flange 83 on the vessel 86 to hold the lid tightly on the vessel 86.

The lid 81 is provided with an inlet 90 for the introduction of acid. Two other openings 93 and 95 in the lid 81 hold the ends of a sealed small diameter fused quartz tube spiral 88 which is disposed within vessel 86. The spiral tube 88 has cooling water circulating therethrough for purposes of cooling the acid. An outlet 92 is disposed in the bottom of the vessel 86 for exit of cooled acid.

The acid from the stream splitter 4 continuously enters the cooler 5 through inlet 90 where it circulates in contact with the cooling water coils 88 and then exits at outlet 92 to the particle counter 6.

THE PARTICLE COUNTER

The particle counter 6 is a flow through device so that the entire side stream is analyzed for particles. Other analytical instruments can also be incorporated at this point. Examples of such instruments which are useful in the present process as applied to the semiconductor industry, include but are not limited to atomic absorption spectrometers for trace analysis and laser particle counters, chromatographs, IR and UV-VIS spectrophotometers; mass spectrometers; emission and plasma emission spectrometers; electrochemical analyzers; chromatographs; and any other desired analytical instrument which would analyze and measure the purity of the sulfuric acid of the stream.

From the particle counter 6, the acid is continuously passed to a diluter 7 which is detailed in FIG. 7.

THE DILUTER

As shown, the diluter 7 is formed of a large diameter fused quartz glass tube 94 having a substantially centrally disposed fused quartz glass tube 96. The tube 96 has an inlet port 98 for the continuous introduction of mete red amounts of ultrapure water which is upstream from an inlet port 100 for the continuous introduction of metered amounts of acid. An outlet 102 for central tube 96 continuously conducts diluted sulfuric acid out of the diluter 7.

Within the quartz tube 94 in contact with the exterior surfaces of central tube 96 is a water jacket of circulating cooled thermostated water.

The central tube 96 has disposed therein a spiral coil of small diameter fused quartz glass tubing 112 which is sealed with respect to the interior of tube 96. The spiral coil 112 communicates with the thermostated water circulating around the exterior of tube 96 by means of an inlet 106 and an outlet 103 through which cooling fluid such as water circulates continuously around the tube 96 and exits at an outlet 104.

In operation, a metering pump or other constant flow device not shown continuously delivers metered amounts of ultrapure water into the central tube 96 through port 98. The ultrapure water is caused to circulate through central tube 96 during which time metered amounts of acid are continuously introduced through port 100 by means of a metering pump 17 for the acid. The metered amounts of acid introduced into the metered amount of water are calculated to provide the desired % by weight acid/water solution.

The acid and water is mixed in the diluter 7 to provide about a 30% to about a 60% by weight sulfuric acid/water solution. Most preferably, the solution is comprised of 50% by weight sulfuric acid. This range of sulfuric acid to water is governed by the requirements of the E-cell for proper operation. When the above range is exceeded in either direction, the result in the E-cell will be either no reaction and/or undesired side reactions. Excellent results have been obtained with a sulfuric acid/water solution in the range of about 45% to about 55% by weight.

The water used must be ultrapure water. The industry standard for ultrapure water is "18 megohm" which refers to its maximum resistivity. The same standard for ultrapure water is used for rinsing of the wafers after the acid cleaning.

The process of diluting the acid causes an increase of temperature. The temperature is reduced by the circulating water jacket of cooling water around the exterior surfaces of the central tube 96 within the large diameter tube 94. Diluted sulfuric acid exiting diluter 7 is cooled to a temperature in the range of about 15° C. to about 25° C., which temperature is a requirement for the proper operation of the electrical cell 10.

A small portion of the diluted stream is preferably diverted to an atomic absorption spectrometer for trace analysis. This is indicated at block 16 of FIG. 1 and is not shown in detail.

The cooled diluted acid which continuously exits diluter 7 at outlet 102 is continuously passed to E-cell 10 which is detailed in FIGS. 11, 12, 13, and 14.

E-CELL

Figure 11:
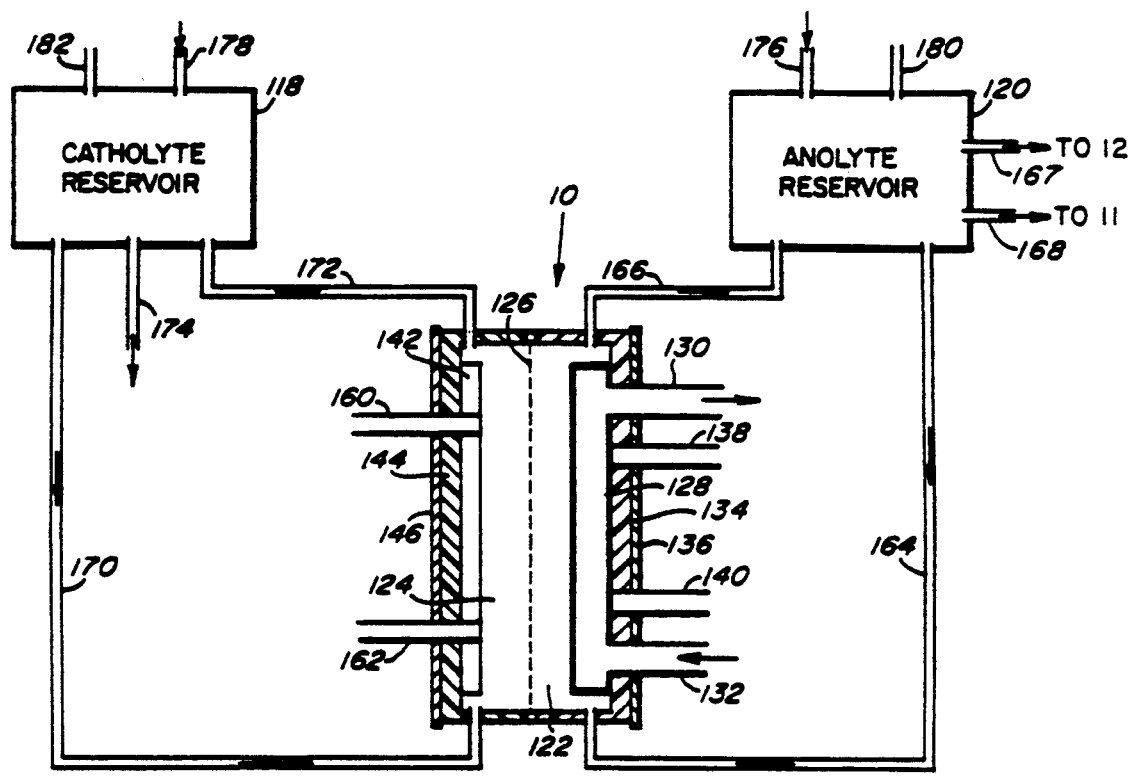
FIG. 11 shows a schematic representation of the electrical cell shown at 10 in the block diagram of FIG. 1.

As shown in FIG. 11, the electrical cell includes an anode compartment 122 and a cathode compartment 124 separated by a membrane 126. The anode compartment 122 communicates with an anolyte reservoir 120 while the cathode compartment 126 communicates with a catholyte reservoir 118. Both the anolyte reservoir 120 and the cathode reservoir 118 are positioned above the E-cell 10.

The anode compartment 122 includes a hollow, water cooled anode electrode 128 having ports 130 and 132 for circulation of water in and out of the hollow electrode. A Teflon (TM) layer 134 substantially surrounds the anode compartment 122 for insulation purposes. It is held in place by means of an outer plate 136. The electrode 128 also includes projections 138 and 140 for electrical connection to a power source, not shown.

The cathode compartment 124 includes a cathode plate 142. A Teflon (TM) insulator 144 partially wraps around the E-cell in the same manner as for the anode compartment 122. A plate 146 is held against the Teflon (TM) layer 144. The cathode plate 142 also includes electrical contacts 160 and 162 which are connected to a power source, not shown.

The Teflon (TM) insulators 134 and 144 together surround the E-cell 10 in the form of a box. The insulators 134 and 144 are held together by means of the outer plate 136 and the outer plate 146. The plates 136 and 146 are bolted together at the ends thereof by means of bolts 148 and 150 which are secured at the ends thereof by means of nuts 152, 154, 156 and 158. This is made possible by interior threading on each of the nuts 152, 154, 156 and 158 in conjunction with exterior threading on the exterior ends of the bolts 148 and 150 respectively.

The anolyte reservoir 120 is in communication with the anode compartment 122 by means of a tube 164 and a tube 166. The anolyte reservoir 120 is also provided with an outlet tube 168 for continuous discharge of oxidant solution to the wafer bath 11. An inlet 176 is provided for continuous introduction of diluted acid from water cooler 9 for reaction in anode compartment 122. An outlet 180 is provided for the venting of gases from the anolyte reservoir 120.

The catholyte reservoir 118 communicates with the cathode compartment 124 by means of tube 170 and tube 172. Another tube 174 provides a means for draining of the catholyte reservoir 118. Catholyte solution is introduced through inlet tube 178. An outlet 182 is provided for the venting of gases from the catholyte reservoir 118.

Figure 13:
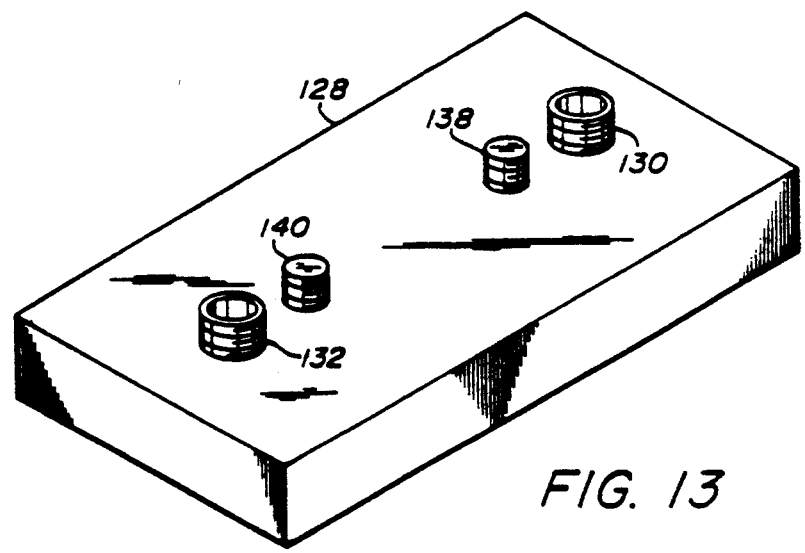
FIG. 13 shows an enlarged perspective view of the water cooled anode of FIG. 12.

As shown in FIG. 13, the anode 128 is in the form of a closed, hollow, generally rectangular configuration having openings 130 and 132 for the introduction and withdrawal of water for purposes of cooling. The anode 128 also is provided with solid pins 138 and 140 for purposes of electrical connection.

According to a preferred embodiment, the anode 128 is composed of platinum plated titanium and has a wall thickness of about 100 mils. The water circulates only on the inside of the anode 128 with the anolyte solution circulating on the exterior of the anode electrode 128.

Figure 14:
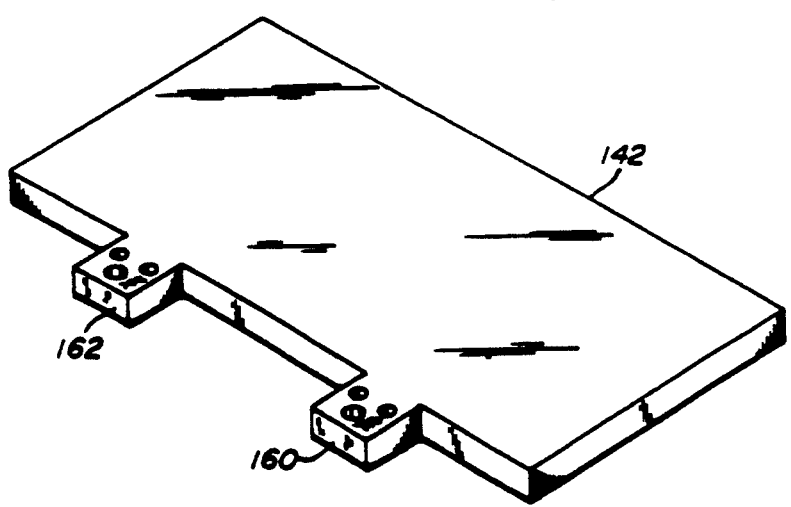
FIG. 14 shows an enlarged perspective view of the cathode of FIG. 12.

As shown in FIG. 14, the cathode 142 is in the form of a flat plate having a thickness of about 20 mils. Tabs 162 and 160 are provided for electrical connection. The cathode is preferably composed of platinum sheet although lead or graphite can be used.

The catholyte and anolyte solutions circulate on one side of the electrodes 142 and 128 respectively between the electrodes and the semipermeable membrane 126. The membrane 126 is preferably formed of a proprietary material manufactured by Dupont which is called "NAFION" (TM). Other materials can be used in place of the "NAFION" (TM) semipermeable membrane. Such materials must be resistant to the corrosive action of sulfuric acid at the concentrations employed. Examples of such materials include but are not limited to polytetrafluoroethylene and silicone.

The arrangement of the catholyte and anolyte reservoirs 118 and 120 spaced above the electrical cell 10 avoids the need for use of a pump in circulating the catholyte and anolyte solutions through the electrical cell. This is made possible by the use of liberated gas from water electrolysis chemical reactions taking place in the electrical cell 10 to continuously pump the solution back to the respective reservoirs 120 and 118.

In operation, the catholyte reservoir 118 is filled with catholyte which is comprised of between about 30% and about 60% by weight sulfuric acid in water. Most preferably, 50% by weight sulfuric acid is employed.

Since this acid solution only circulates between the catholyte reservoir 118 and the cathode compartment 124 of the E-cell, ultrapure sulfuric acid and ultrapure water are not required. Filling of the catholyte reservoir 118 takes place through inlet tube 178.

During operation of the E-cell 10, water from the anode compartment 122 continually passes through semipermeable membrane 126 into the cathode compartment 124. This dilutes the sulfuric acid solution within the catholyte reservoir. As a consequence, sulfuric acid must be added as needed to maintain the desired sulfuric acid concentration.

The anolyte reservoir 120 is continuously filled with diluted sulfuric acid of approximately 30% to about 60% by weight and preferably 50% by weight sulfuric acid in ultrapure water which continuously arrives from the diluter 7 at a temperature of approximately 15° C. to about 25° C. This temperature range insures stable operation of the E-cell 10. At the same time, cooling water is introduced and continuously circulated through hollow anode 128 through ports 130 and 132 of E-cell 10.

With both anolyte and catholyte reservoirs 120 and 118 filled, the respective connecting anode and cathode compartments 122 and 124 fill by gravity flow.

A voltage is applied from a power source, not shown, between the anode 128 (+) and the cathode 142 (−). The electrochemical reactions which are believed to take place in the E-cell 10 are shown below:

Anode Reaction

Main Reaction: 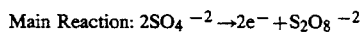 $2SO_4^{-2} \rightarrow 2e^- + S_2O_8^{-2}$

Parasitic Reaction from Electrolysis of Water:

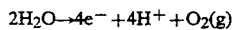 $2H_2O \rightarrow 4e^- + 4H^+ + O_2(g)$

Cathode Reaction

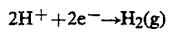 $2H^+ + 2e^- \rightarrow H_2(g)$

This electrochemical oxidation of the diluted sulfuric acid forms peroxydisulfuric acid in the anode compartment 122. As shown above, oxygen is evolved in the process, representing a substantial volume increase. This oxygen gas is used to pump the oxygen and liquid in a continuous manner up to the anolyte reservoir 120. The gas is vented through vent 180. A flow meter, not shown, can be used in order to monitor the rate of evolved oxygen which can subsequently be correlated with the amount of peroxydisulfuric acid generated.

The acid in the anolyte reservoir 120 with the gas removed is then recirculated, continuously down through the tube 164 to make continuous passes through the anode chamber 122 of the electrical cell 10.

At the same time, a portion of the acid solution in the anolyte reservoir 120 is continuously being passed to the wafer process bath 11 through tube 168. The amount is equivalent to the amount which is delivered from the diluter 7 through the inlet 176. The output is preferably motivated by gravity flow to avoid the introduction of impurities which might be the case if a pump were used.

Contemporaneously, newly purified diluted sulfuric acid is continuously arriving from the diluter 7. In this manner, inflow from the diluter 7 and outflow to the wafer bath 11 is stabilized.

If any excess liquid is produced in the anolyte reservoir 120, it can be drained off to the surge tank 12 through port 167 for reprocessing through the stripper 1 and distillation column 2.

At the same time that the reaction is taking place in the anode compartment 122, reaction is simultaneously taking place in the cathode compartment 124. The reaction taking place here produces hydrogen gas which in a similar manner to the reaction in the anolyte compartment 122 acts to pump solution from the cathode compartment 124 through tube 172 back up to the catholyte reservoir 118. Here, the hydrogen gas is vented away from the catholyte reservoir 118 through vent 182.

The hydrogen thus produced can be used in any desired manner such as by collection and further use. Alternatively, if desired, it can be diluted with an inert gas such as nitrogen, to render it harmless. It can then be vented to the atmosphere.

The catholyte solution present in the catholyte reservoir 118 which has had the gas removed proceeds in a continuous manner down through tube 170 back into the cathode compartment 124. Here, it again reacts and is pumped upwardly by means of the hydrogen gas evolved through tube 172 back to the catholyte reservoir 118.

The reaction proceeds in this manner continuously. The oxidant solution thus produced is added continuously to the wafer bath 11 together with sulfuric acid arriving continuously from the condenser and cooler 3 which has been separated by means of the stream splitter 4.

Once started the E-cell operates continuously in a stable manner. The voltage and current will also be stable and will signal a malfunction if there is a change. The cell requires, as noted above, sulfuric acid in about a 30%–60% by weight solution in water and a temperature in the range of about 15° C. to about 25° C.

The exact voltage and current will vary with the size of the cell. The exact Figures can be arrived at empirically by testing at each current and voltage.

The E-cell constitutes a novel feature of the invention. Here, peroxydisulfuric acid is generated by the action of the E-cell on the dilute sulfuric acid. In addition, the gases generated in the anode and cathode compartments are utilized to pump the catholyte and anolyte to their respective reservoirs above the E-cell. This avoids the need for a pump which could introduce impurities and provides a reservoir of freshly generated oxidant for addition to the wafer cleaning bath.

A preferred method of start up operation of the system is to start with a sufficient quantity of sulfuric acid solution in the range of 95% to about 98% by weight in water. This is conveniently introduced at the surge tank 12 and purified through the system as above described.

At the stream splitter 4, about 2%–20% by weight and preferably 2% by weight of the purified sulfuric acid is split from the main stream for oxidation in the E-cell 10. The remaining 98% to 80% by weight passes directly to the wafer cleaner 11.

The 2%–20% by weight purified sulfuric acid is passed to the cooler 5, particle counter 6, and diluter 7 where it is mixed with water and cooled to provide about a 30% to about 60% and preferably a 50% by weight solution of acid in water. A portion of the stream is diverted to the atomic absorption spectrometer 16 for trace analysis. The remainder is directed to the anolyte reservoir 120.

With the catholyte reservoir 118 charged with the required amount of sulfuric acid/water solution, the operation of the E-cell 10 is begun. Before passing the anolyte solution to the wafer cleaning station 11, a concentration of at least about 0.05M and typically 0.5M peroxydisulfuric acid is first reached. The wafer cleaning process requires a concentration of least about 0.03M peroxydisulfuric acid after mixing with the main stream of sulfuric acid to be effective. The upper concentration limit of peroxydisulfuric acid which can be produced by this E-cell is about 1M to 2M.

When the desired molar concentration of peroxydisulfuric acid has been reached, anolyte can be withdrawn from the anolyte reservoir and passed to the wafer cleaning station 11. At the same time additional purified diluted sulfuric acid is added from the cooler and condenser 3. These two streams taken together are equivalent to the amount being continually withdrawn from the wafer cleaning station 11 and occasional additions of sulfuric acid to the surge tank 12. The additions are needed to make up for waste acid withdrawn at the stripper 1, distillation column 2, and drag out as cleaned wafers are removed from the cleaning bath. By this process, a state of equilibrium is established which can be maintained continuously.

Occasionally, sulfuric acid needs to be added to the catholyte reservoir to counteract the dilution effect of water entering cathode compartment 124 through semipermeable membrane 126 of E-cell 10. However, this acid does not normally contact the oxidant repurification stream. Only when the catholyte reservoir overflows to the surge tank does contact with the repurification stream take place.

Sulfuric acid and peroxydisulfuric acid are highly corrosive and are very reactive. They are capable of dissolving most metals and will oxidize. A dehydrate or sulfonate most organic compounds. Their reaction with water generates a great deal of heat and can cause explosive spattering. For this reason, in the diluter 7 only small amounts of acid are mixed with water and extensive cooling is provided.

It is important that the apparatus of this invention utilize materials which are not corroded by or reactive with sulfuric acid, peroxydisulfuric acid and/or high temperatures. For this reason, standard technology vitreous quartz and polytetrafluoroethylene (Teflon TM) are preferred materials to be used in contact with the acids.

A further feature of the invention which is not shown is the monitoring of all of the separate steps. For example, liquid levels in all parts of the system are monitored, as well as particle content and purity for the overall process. The latter is accomplished by means of the particle counter 6 and atomic absorption spectrometer 16. Temperature monitoring is also provided to automatically open and close valves for consistent processing and for safety.

The following example is given for the purpose of illustrating the invention and is in no way intended to constitute a limitation thereof.

EXAMPLE

Using the apparatus as above described, about 4 liters of 50% by weight sulfuric acid are added to the catholyte reservoir and about 4 liters of 50% by weight sulfuric acid are added to the anolyte reservoir. Then 95% to 98% by weight sulfuric acid is added slowly to the surge tank and the pump between the fluoride removal column and the stripper is started. This causes the stripper to fill with acid which overflows to the distillation column. Acid addition is continued until the desired level of acid in the distillation column can be seen. At this point the system is partially charged and about 40 liters of acid are required to reach this point.

The main power to the system and support utilities including the oil and water heat exchangers is switched on. The main control panel is then turned on and all of the system diagnostics are checked. When everything checks out, the power to the distillation and stripper heaters are advanced to about 20% of full power. The control panel is then observed for the next half hour during which time the system is warmed up. If everything checks out, the power is advanced to 50% of full power. This results over time in visible boiling in the distillation column and the production of steam in the stripper.

The control panel is checked again and if all looks well, then full power is applied to the distillation and stripper heaters. The temperature is brought to and maintained at about 280° C. at the stripper. Boiling is maintained at the distillation column. As the liquid acid present in the distillation column begins to distill, the remainder of the system is gradually charged with acid. The level of the surge tank is kept at a set level, with acid being added to maintain that level. The amount added corresponds to the amount of acid passing through the distillation column. Acid additions to the surge tank are continued until the entire system is charged with acid. The total volume of the system is about 60 liters.

When the system is on and fully functioning, the ultrapure water for the diluter is turned on. Then the pump for the acid to the mixer is turned on. The valve from the splitter to the anolyte reservoir is then opened. At this point, the power to the E-cell is turned on and the E-cell begins to operate. The time for the preceding to take place is about two hours.

When the E-cell has been operating for about two hours and the process appears to have stabilized throughout the system, the valve from the anolyte reservoir to the wafer cleaning station is opened. When the desired operating temperature is reached at the wafer cleaning station and the process appears to have stabilized such that input is substantially equal to output, a sample of the wafer bath is taken for analysis. This is conveniently done by titration.

If the desired makeup of the wafer cleaning oxidant bath is comprised of 92% by weight sulfuric acid, at least 0.03M peroxydisulfuric acid, and the balance water, then the wafer cleaning process is begun. If the concentration of peroxydisulfuric acid is too high the flow rate into the bath is decreased slightly. Conversely if the concentration of the peroxydisulfuric acid is too low, the flow rate into the bath is increased slightly. This can conveniently be done by adjustment of the valves into and out of the anolyte reservoir. For the size E-cell shown, the flow rate is about 60 ml per minute.

Initially the concentration of any trace impurities in the sulfuric acid prior to stabilization of the process is approximately 100 PPB. After stabilization of the process has been reached the concentration of any specific trace impurity is <10 PPB. Also, particles are reduced from 10–100,000/cc particles of 1–15 micron size to <5/cc particles of 1 micron and greater size.

During the wafer cleaning process, small amounts of acid are lost by dragout of the acid during removal of the cassettes from the wafer cleaning oxidant bath. This requires periodic replacement through the surge tank. A level sensor in the surge tank is employed to indicate when acid additions are required.

The system has been run for more than 1000 hours with only periodic additions of acid. During this time, waste acid was not removed from the distillation column or from the stripper. It is believed that, depending upon the impurities introduced by the wafers that the system can be operated for about three months before the concentration of trace elements would increase sufficiently high to require shut down of the process. At this time all of the acid is preferably discarded and a new batch of acid added.

THE WAFER CLEANING

Semiconductor wafers are cleaned of residual particles and contaminants acquired on their surfaces during manufacture. Cleaning of semiconductor wafers must be conducted under very clean, class 100 or better clean room conditions. For this reason, the wafer cleaning process is conducted in a room physically separate from the repurification process. Here, the air is highly filtered to remove all particles.

The invention is primarily directed to the method and apparatus for the reprocessing of the oxidant used in the wafer cleaning process. Thus, any wafer cleaning process station can be used without limiting the invention.

Wafer cleaning processes are sometimes called stripping processes. The wafers are cleaned by removing polymer and other contaminants acquired during their manufacture. Sometimes this includes prediffusion cleaning which is conducted prior to a high temperature furnace step. The same oxidant baths are used for these processes.

Some wafer cleaning techniques utilize spraying of the wafers in order to clean them. Another technique, which is illustrated herein, utilizes immersion of the wafers for cleaning with a spray water rinse. Other rinse techniques including cascade, spray only, etc are fully satisfactory as well. The invention is not limited by the wafer cleaning process or by the method of rinsing. It is to the production of the oxidant bath and the use thereof in any wafer cleaning process that the invention is directed.

As shown in FIG. 8, an acid bath 200 and a quick dump spray water bath 202 are enclosed in an upright housing 210. A clear, plastic hinged cover 213 provides convenient access to the acid bath 200 and water bath 202. In addition, the cover 213 guards against the introduction of impurities during the wafer cleaning process. The acid bath 200 and the water bath 202 are supported within the housing 210 by a shelf 207 which extends crosswise of the housing 210.

Figure 9:
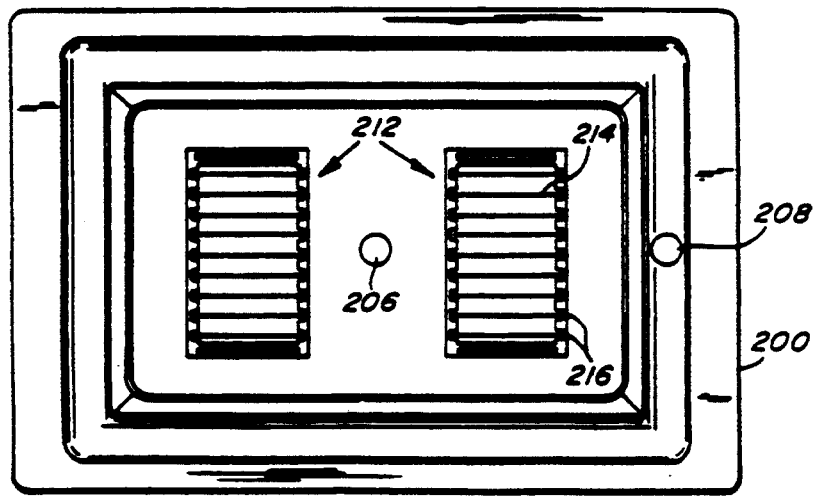
FIG. 9 shows a schematic top plan view of the wafer cleaning bath of FIG. 8.
Figure 10:
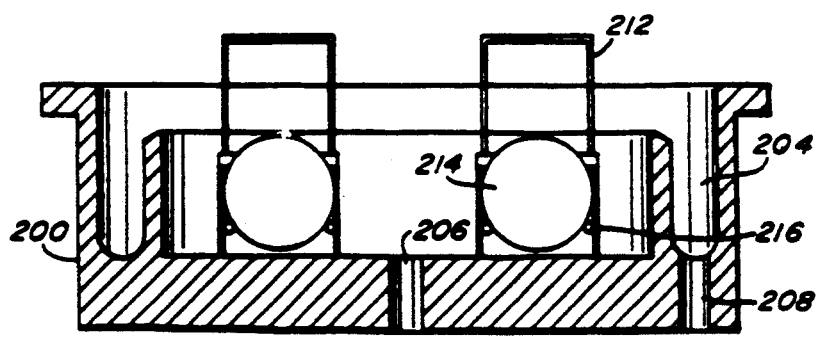
FIG. 10 shows an enlarged detailed schematic view of the wafer bath of FIG. 8.
Figure 12:
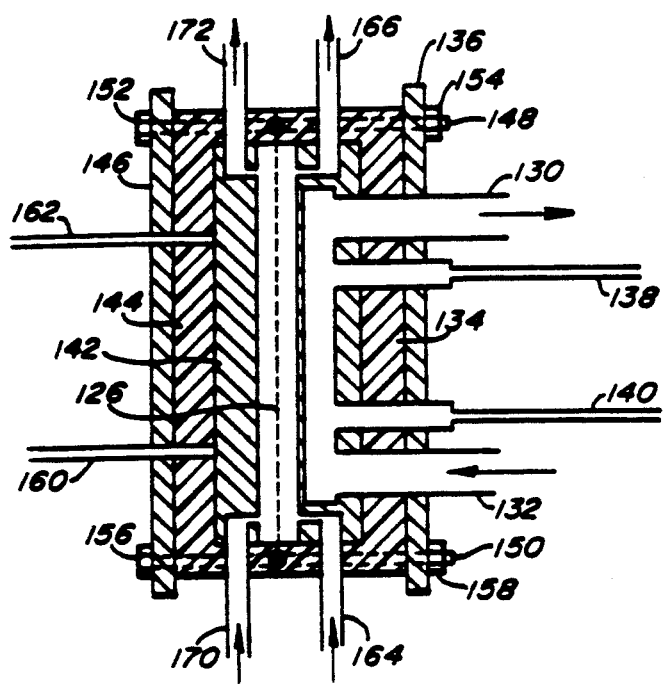
FIG. 12 shows a sectional view of the electrical cell 10.

The wafers are normally emplaced under clean room conditions into Teflon (TM) cassette boats 212 shown in FIG. 9 which are slotted at 216 to hold a row of semiconductor wafers 214. The slots 216 merely act to hold the wafers in place during immersion. FIGS. 9 and 10 show a detail of the acid bath 200.

Referring to FIG. 8, a bath 200 of oxidant solution is prepared with usually an adjacent quick dump ultrapure water bath 202 for rinsing away the acid. The semiconductor wafers 214, held in cassette boats 212 are immersed first in the acid bath 200 for a time sufficient to clean them of impurities. At the end of the cleaning period, the cassette boat 212 of wafers is removed from the acid bath and placed in the ultrapure water bath 202 for rinsing.

The oxidant solution bath 200 is surrounded by an overflow trough 204. As the acid from the cooler and condenser 3 and oxidant solution from the anolyte reservoir 120 are continually introduced into the bath 200 through inlet 206 in the bottom of the bath, the oxidant constantly overflows into the trough 204. From the trough 204, the acid solution exits through outlet 208 and is passed to the surge tank 12 for repurification according to the invention process.

The water bath 202 is shown in FIG. 8. It includes a tank 310 having a support grid 330 spaced from the bottom to support the cassette boats 212. Near the top of the tank 310 are a plurality of spray nozzles 320 which spray ultrapure water down onto the cassette boats 212. A very large orifice drain valve 340 is disposed in the bottom of the tank 310. After the cassettes boats 212 are placed within the tank 310 on the grid 330, ultrapure water is sprayed onto the cassette boats 212 from the spray nozzles 320. During this time the drain valve 340 is closed. When the tank 310 is filled, an automatic sequencer, not shown, opens the large orifice valve 340 and quickly drains the entire tank of rinsed water. The sequencer then shuts the drain valve and the tank 310 refills. This cycle is commonly repeated five times in a period of less than 5 minutes to provide a totally effective rinse.

Since the acid bath 200 is constantly being renewed, cleaning of the wafers can be accomplished with a higher degree of purity than by prior art processes. This represents a considerable improvement in quality. Cost savings are also provided.

SYSTEM ARRANGEMENT

Figure 15:
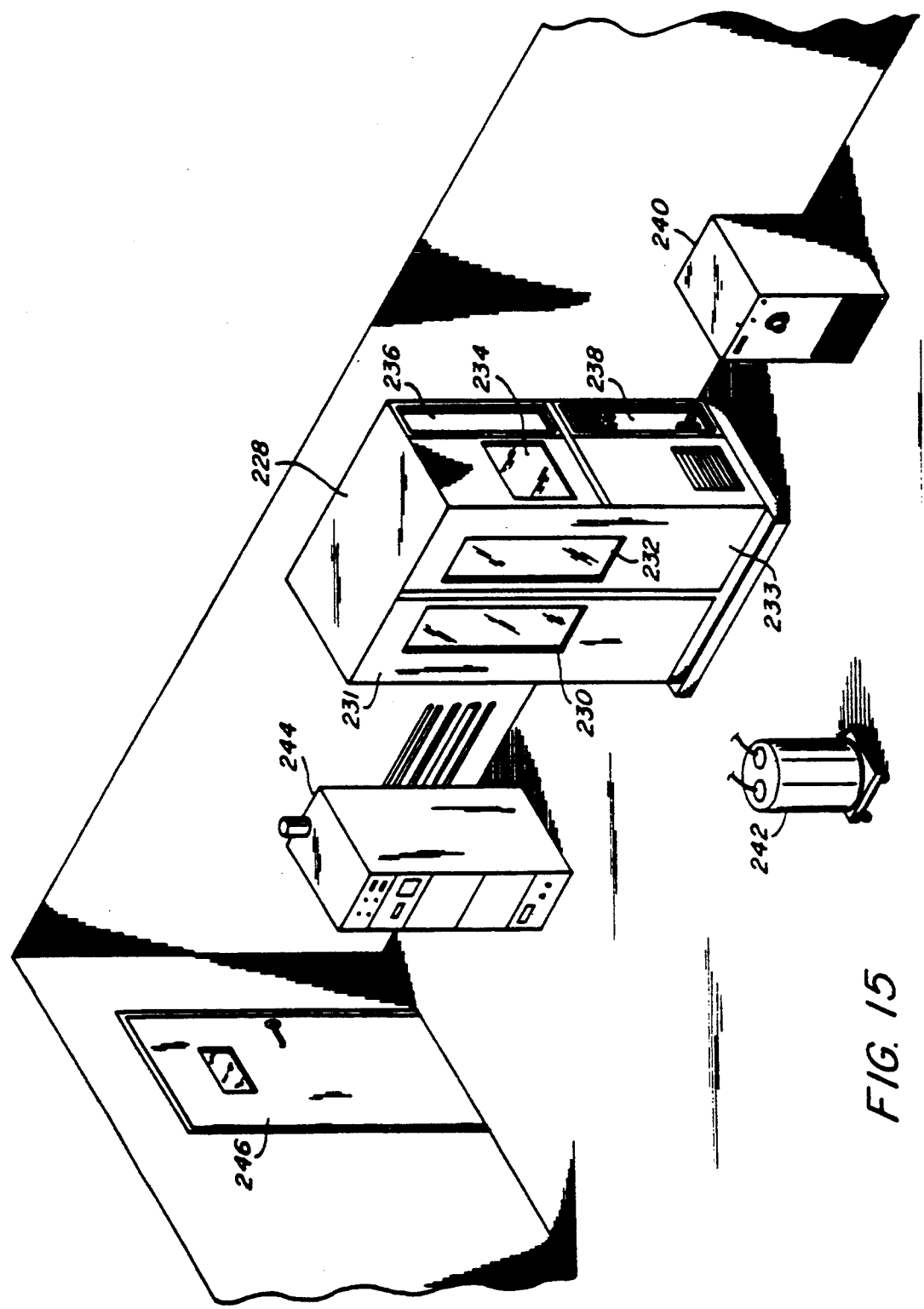
FIG. 15 shows a perspective view of the apparatus of the invention, a portion of which is enclosed in a housing.
Figure 17:
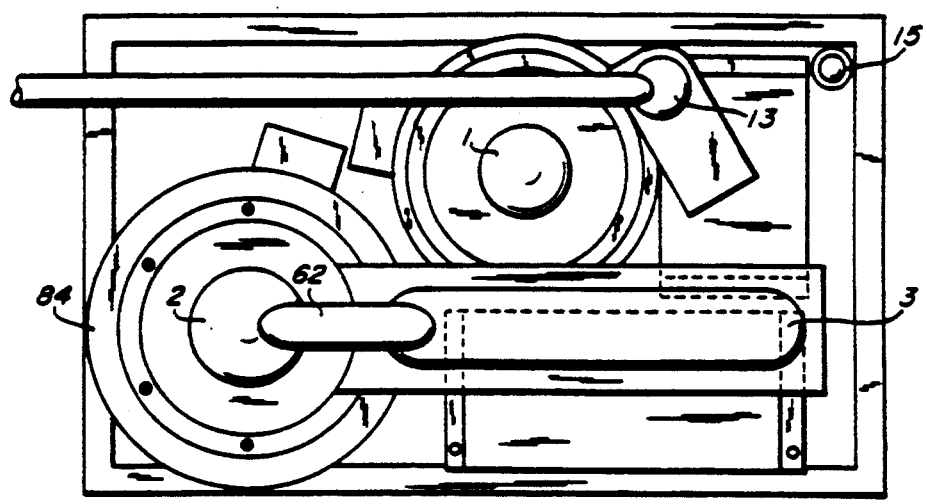
FIG. 17 shows a top plan view of the apparatus of FIG. 16.
Figure 16:
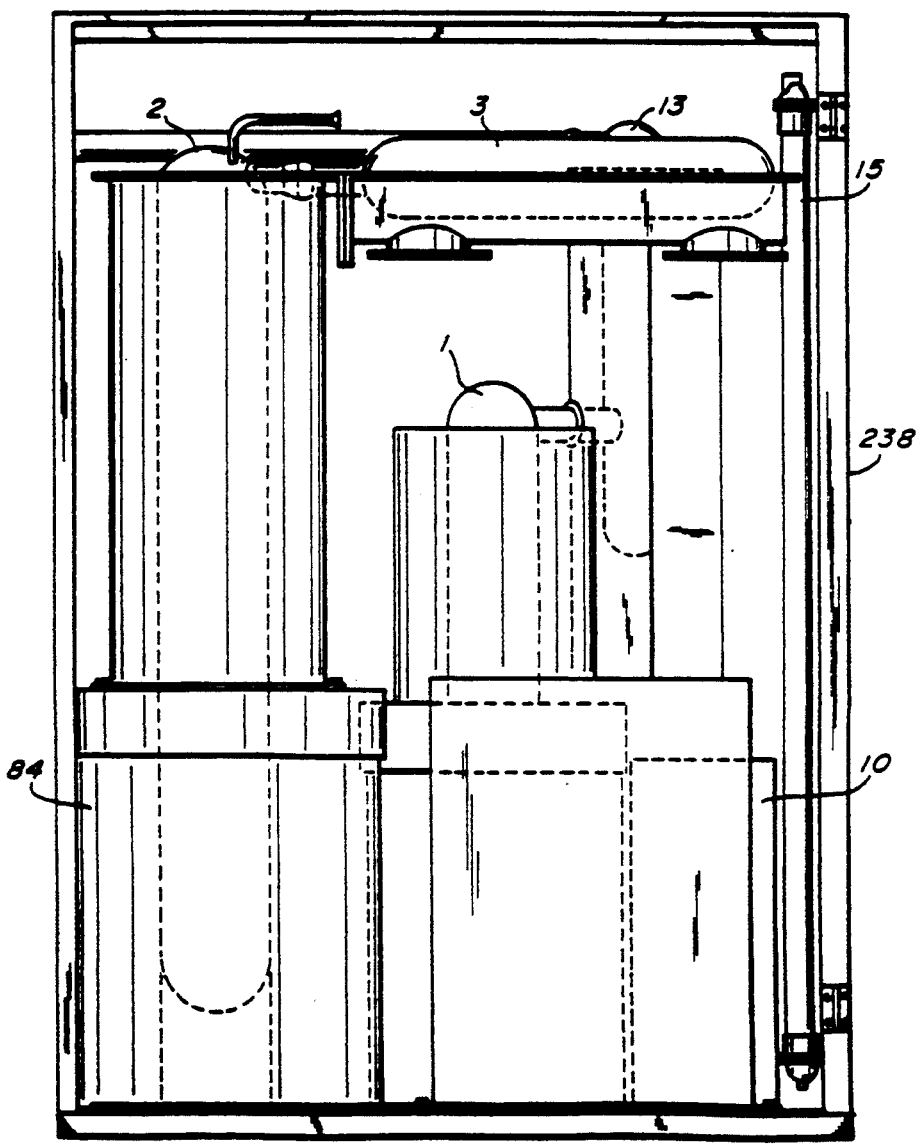
FIG. 16 shows a detailed view of the apparatus enclosed in a housing.

FIG. 15 shows a perspective view of a preferred arrangement of the reprocessing apparatus of the invention. As shown, a steel enclosure 228 houses the bulk of the processing equipment, namely the surge tank 12, the pump 15, the fluoride removal column 14, a heat exchanger 17 not shown in the other drawing, the stripper 1 with attached condenser 13, the distillation column 2, the condenser and cooler 3, the stream splitter 4, the water cooler 5, the particle counter 6 and atomic absorption spectrometer 16, the pump 17, diluter 7, and E-cell 10. FIGS. 16 and 17 shown an enlarged showing of the enclosure 228.

This enclosure 228 includes a pair of hinged doors 231 and 233 which hold windows 230 and 232 respectively. Side windows 234 and 236 together with windows 230 and 232 permit the viewing of fluid levels as well as the other observable process steps. A side opening 238 permits exterior connections by means of tubing for pure water, nitrogen, and cooling water. The cooling water is cooled in an adjacent heat exchanger 240. The connections are not shown. A similar opening, not shown, which is located in the opposite side permits connection to the electrical supplies, control systems, and monitoring system 242. By enclosing the apparatus within an enclosure, increased safety levels are ensured.

The wafer cleaning station 11 is located separately in a clean room adjacent to the apparatus described. Only the door 246 to the clean room is shown. Additional connections in opening 238 permits tubing, not shown, to be passed through the walls of the clean room for connection between the wafer cleaning station 11 and the E-cell 10 and condenser and cooler 3, and surge tank 12 as previously described. Alternative configurations, which are remote or at a different level are possible with non-contaminating pumping and delivery systems.

While the invention process and apparatus are discussed and illustrated using, for example, one separator, one distillation column, and one electrical cell, it is contemplated that in some instances more than one of these and other elements would desirably be used. Thus, a series of separators and/or a series of distillation columns could be used to increase the purity of the sulfuric acid over that which is possible with only one of such elements. Likewise, in the case of the electrical cells, a series of electrical cells could be used to increase the amounts of peroxydisulfuric acid generated.

Various other modifications of the invention are contemplated which will be apparent to those skilled in the art and which can be resorted to without departing from the spirit and scope of the invention as defined by the following appended claims.

We claim:

1. Distillation apparatus for the distillation of liquids comprising;
    a distillation chamber having walls;
    means for heating said distillation chamber;
    at least one porous annular ring within said distillation chamber and spaced from said chamber walls to act as nucleation sites and to provide smooth convective upward flow of liquid and vapor proximate to said side walls during distillation; and,
    smooth convective downward flow of liquid and vapor substantially centrally of said distillation chamber during distillation.

2. Distillation apparatus as claimed in claim 1 wherein said at least one porous annular ring is located proximate to said walls and wherein said heating means is provided to said walls in the vicinity of at least one porous annular ring.

3. Distillation apparatus as claimed in claim 2 wherein said at least one porous annular ring is adhered to said chamber walls.

4. Distillation apparatus as claimed in claim 2 wherein said at least one porous annular ring is integral with said chamber walls.

5. Distillation apparatus as claimed in claim 1 wherein said distillation chamber has an upper portion for vapor and a lower portion for liquid and further comprising redirection means for conducting vapor to cause the vapor to condense and fall substantially centrally of said distillation chamber.

6. Distillation apparatus as claimed in claim 5 wherein said redirection means is disposed within the upper portion of said distillation chamber and are comprised of at least one substantially truncated funnel shaped ring having a larger opening directed upwardly and a smaller opening directed downwardly.

7. Distillation apparatus as claimed in claim 6 further comprising packing disposed within said upper portion of said distillation chamber and further comprising reflux means for condensation and reflux of said vapor.

8. Distillation apparatus as claimed in claim 7 wherein said reflux means comprises a reflux condenser head within the upper portion of said distillation chamber.

9. Distillation apparatus as claimed in claim 8 wherein said distillation chamber, said boiling rings, said packing, said redirection rings, and said reflux condenser head are comprised of fused quartz glass.

10. Distillation apparatus as claimed in claim 7 wherein said reflux means comprises:
    a separate condenser means in communication with said upper portion of said distillation chamber for receipt of vapor from said chamber and for overflow discharge of liquid condensate from said condenser back into said distillation chamber to provide reflux.

11. Distillation apparatus as claimed in claim 10 wherein said distillation chamber, said porous annular boiling rings, said packing means, said redirector rings, and said separate condenser means are comprised of fused quartz glass.

12. Distillation apparatus according to claim 5 further comprising liquid outlet means for removal of liquid and vapor outlet means for exit of vapor.

13. Distillation apparatus as claimed in claim 1 further comprising sizing said distillation chamber with a height sufficiently tall to enable movement of distilled liquid from said distillation apparatus to a distant point of gravity flow.

14. A distillation apparatus for the distillation and condensation of liquids comprising:
    a first elongated upright chamber having an inlet and outlet for liquids contained therein;
    heating means surrounding said first chamber for purposes of heating the contents contained therein;
    a plurality of substantially concentric boiling rings within said first chamber and disposed substantially axially near the bottom of said first chamber and spaced from the walls of said first chamber;
    means for securing said boiling rings in spaced relationship to the interior walls of said first chamber;
    a packing stop disposed substantially crosswise of said first chamber above said boiling rings;
    at least one redirector ring within said first chamber and comprising a substantially truncated funnel shaped ring having a large opening and a smaller opening which is disposed above said packing stop with its smaller opening facing the bottom of said first chamber;
    packing disposed above said packing stop and within and without said redirector ring;
    a reflux condenser head disposed within the upper part of said first chamber;
    a vapor outlet disposed near the top of said chamber for continuous escape of vaporized liquids;
    a condenser and cooler in communication with said vapor outlet from said chamber;
    said condenser and cooler comprising a second chamber;
    at least one cooling means within said condenser and cooler for cooling and condensing vapor contained therein; and,
    an outlet for condensed liquid.

15. A distillation apparatus as claimed in claim 14 wherein:
    said condenser and cooler is disposed substantially horizontally;
    said cooling means with said condenser is comprised of at least one spiral tube sealed with respect to the interior contents of said second chamber and having circulated therethrough cooling fluid;
    said condenser further including a vent for vapor which fails to condense within the condenser;

a second condenser containing cooling means in communication with said vent; and wherein, said reflux condenser head is comprised of a coiled section of small diameter tubing sealed with respect to the interior of said second chamber and having cooling fluid circulating therethrough;

and wherein said packing is comprised of small diameter tubing cut crosswise into a plurality of smaller lengths.

16. A distillation apparatus comprising:

a first elongated substantially upright chamber having an inlet and outlet for liquids contained therein;

heating means surrounding said first chamber for purposes of heating the contents contained therein;

a plurality of substantially concentric boiling rings within said first chamber and disposed substantially axially near the bottom of said first chamber and spaced from the sidewalls of said first chamber;

means for securing said boiling rings in spaced relationship to the interior walls of said first chamber;

a packing stop disposed substantially crosswise of said first chamber above said boiling rings;

at least one redirector ring disposed above said packing stop;

packing disposed above said packing stop and within and without each said redirector ring;

a vapor outlet disposed near the top of said chamber for continuous escape of vaporized fluids;

a condenser and cooler in communication with said vapor from said chamber; and, a downwardly sloping conduit from said condenser and cooler to said distillation column whereby liquid condensate from said condenser can overflow back to said distillation column to provide reflux.

17. Distillation apparatus for the distillation and condensation of corrosive acid liquids comprising:

a first distillation unit including a chamber having walls and inlet means for introduction of feed liquid composed of a corrosive acid liquid to be purified and recovered and impurities having a boiling point below that of the liquid to be purified and solid particulate contaminant impurities of a size and size distribution;

said first distillation unit being operative to effect separation of the impurities having a boiling point below the liquid to be purified and recovered by converting to a vapor substantially all of the impurities having a boiling point below that of the liquid to be purified and to increase the concentration of the liquid to be purified and recovered over that present in the feed liquid thereby to form a partially purified liquid;

said first distillation unit being composed of a material which is resistant to corrosion by the corrosive acid liquid;

vapor outlet means for removal of substantially all of the impurities having a boiling point below that of the liquid to be purified as a vapor from said first distillation chamber;

liquid outlet means for removal of a portion of the liquid to be purified and recovered and the solid particulate impurities therein contained in said first distillation chamber;

heating means for said distillation chamber for heating the contents contained therein;

said heating means being external of the walls of said distillation chamber and being operative to heat the walls thereby to heat the feed liquid to a temperature to vaporize the impurities having a boiling point below that of the liquid to be purified;

a second distillation chamber having walls and liquid inlet means in communication with said liquid outlet means of said first distillation chamber for withdrawal of the partially purified liquid from said liquid outlet means of said first distillation chamber and introduction thereof as feed liquid for said second distillation chamber;

said second distillation unit being composed of a material resistant to corrosion by said corrosive liquid material and operative to effect separation of the solid particulate impurities from said liquid to be purified and recovered by converting to a second vapor substantially all of the liquid to be purified and recovered whereby substantially all of the solid particulate impurities remain in a non-volatilized feed liquid contained in said second distillation unit thereby to reduce the particle size and size distribution of the particles in said second vapor;

liquid outlet means in said second distillation chamber for removal of at least a portion of the non-volitized feed liquid contained therein;

vapor outlet means for exit of second vapor from said second distillation chamber;

means in said second distillation unit composed of a material resistant to corrosion by the corrosive liquid to permit said second vapor to travel towards said vapor outlet means for said second vapor while retaining a substantial portion of said particles in said second distillation unit;

condensation means in communication with said vapor outlet means for condensing second vapor to a liquid which is purified and to be recovered and which includes solid particulate contaminant impurities of a size and size distribution less than that of the starting feed liquid;

heating means for said second distillation chamber for heating the contents contained therein; and, said heating means for said second distillation chamber being external to the walls of said second distillation chamber and being operative to heat the walls thereof thereby to heat the liquid therein to a temperature to vaporize the liquid to be purified and recovered.

18. Distillation apparatus as claimed in claim 17 wherein at least one of said first and second distillation chambers are of fused quartz glass.

* * * * *